United States Patent
Ganesh et al.

(10) Patent No.: US 9,359,074 B2
(45) Date of Patent: Jun. 7, 2016

(54) METHODS, SYSTEMS AND DEVICES FOR DELIVERY DRONE SECURITY

(71) Applicant: QUALCOMM Incorporated, San Diego, CA (US)

(72) Inventors: Shriram Ganesh, San Diego, CA (US); Jose Roberto Menendez, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/480,062

(22) Filed: Sep. 8, 2014

(65) Prior Publication Data

US 2016/0068264 A1 Mar. 10, 2016

(51) Int. Cl.
*B64C 27/04* (2006.01)
*B64C 39/02* (2006.01)
(Continued)

(52) U.S. Cl.
CPC .............. *B64C 39/024* (2013.01); *G01S 19/42* (2013.01); *G05D 1/0022* (2013.01); *G05D 1/042* (2013.01); *G05D 1/101* (2013.01); *G06F 17/604* (2013.01); *G06Q 10/083* (2013.01); *G06Q 10/0833* (2013.01); *G06Q 30/0261* (2013.01); *G06Q 30/0635* (2013.01); *G06Q 30/0637* (2013.01); *G06Q 30/0641* (2013.01); *G06Q 50/28* (2013.01); *G08G 5/0069* (2013.01); *A63H 27/12* (2013.01); *B64C 2201/128* (2013.01); *B64C 2201/145* (2013.01); *B64C 2201/146* (2013.01); *B64D 1/12* (2013.01); *G05D 1/102* (2013.01)

(58) Field of Classification Search
CPC .......... G06Q 30/0637; G06Q 30/0641; G06Q 30/0261; G06Q 50/28; G06Q 10/083; B64C 2201/128; B64C 39/024; G05D 1/102; G08G 5/0069; A63H 27/12; B64D 1/12; G06F 17/604

USPC ............ 701/2, 3; 244/17.11; 705/14.58, 26.1, 705/26.8, 26.81, 26.82, 26.9, 27.1, 330
See application file for complete search history.

(56) References Cited

U.S. PATENT DOCUMENTS 8,825,226 B1 * 9/2014 Worley, III ................ A63J 1/00
180/170
9,087,451 B1 * 7/2015 Jarrell ................... G08G 5/0069
(Continued)

OTHER PUBLICATIONS

Bender A., "Drones to deliver parcels in Australia starting in March," Retrieved dated on Oct. 15, 2013, Retrieved from the Internet <URL: http://www.techworld.com.au/article/528994/drones_deliver_parcels_australia_starting_march/ >, 4 Pages.
(Continued)

*Primary Examiner* — Russell Frejd
(74) *Attorney, Agent, or Firm* — The Marbury Law Group, PLLC

(57) ABSTRACT

Methods, systems and devices are provided for securing a drone delivering a package of goods to a delivery destination. A notification may be provided to a device of the purchaser that the drone has arrived near the delivery destination. The drone may hover at a secure altitude from a landing zone at the delivery destination. The drone may receive a purchase code associated with a purchase of the package of goods. The drone may authenticate the purchase code as a condition for landing. The drone may land in the landing zone at the delivery destination when the purchase code is authenticated. The drone may abort the landing when the purchase code is not authenticated. The drone may receive a delivery code associated with completing delivery the package of goods. The drone may require the delivery code as a condition for releasing the package of goods.

30 Claims, 15 Drawing Sheets

(51) Int. Cl.
  *B64D 1/12* (2006.01)
  *G06Q 30/02* (2012.01)
  *G06Q 30/06* (2012.01)
  *G01S 19/42* (2010.01)
  *G05D 1/00* (2006.01)
  *G05D 1/04* (2006.01)
  *G05D 1/10* (2006.01)
  *G06Q 10/08* (2012.01)
  *G08G 5/00* (2006.01)
  *G06Q 50/28* (2012.01)
  *G06F 17/00* (2006.01)
  *A63H 27/00* (2006.01)

(56) References Cited

U.S. PATENT DOCUMENTS

| | | |
|---|---|---|
| 2009/0306840 A1 | 12/2009 | Blenkhorn et al. |
| 2011/0006164 A1 | 1/2011 | Maertensson et al. |
| 2011/0084162 A1 | 4/2011 | Goossen et al. |
| 2014/0025235 A1 | 1/2014 | Levien et al. |
| 2014/0032034 A1 | 1/2014 | Raptopoulos et al. |
| 2014/0164126 A1* | 6/2014 | Nicholas .......... A63F 9/24 705/14.58 |
| 2014/0201100 A1 | 7/2014 | Rellas et al. |
| 2014/0204360 A1 | 7/2014 | Dowski, Jr. et al. |

OTHER PUBLICATIONS

"UPS and FedEx developing their Own Delivery Drones to compete with Amazon PrimeAir—Premium Rush Package Delivery Drones herald the coming of Google's Personal Androids that are Almost Human," Retrieved dated on Dec. 5, 2013, Retrieved from the Internet <URL: http://mythoughtsontechnologyandjamaica.blogspot.in/2013/12/ups-and-fedex-developing-their-own.html >, 5 Pages.

International Search Report and Written Opinion—PCT/US2015/042803—ISA/EPO—Nov. 12, 2015.

\* cited by examiner

US 9,359,074 B2

METHODS, SYSTEMS AND DEVICES FOR DELIVERY DRONE SECURITY

BACKGROUND

Exploration of the use of UAV (Unmanned Aerial Vehicles) or drones by industry for delivering goods and products is rapidly expanding. Drones are convenient for rapid point-to-point delivery; however, drawbacks exist. Drones are conspicuous, particularly when making an approach for landing and delivery. Drones may become vulnerable to unwanted attention from malicious actors in the form of theft, damage, and vandalism of the goods for delivery and of the drone itself. As drones near a delivery zone, the drones may be spotted and followed to their ultimate delivery destination. Further, these spottings may be reported on social media enabling malicious actors to intercept them and/or determine their ultimate destination. Drone deliveries may be scheduled on-line, whereupon delivery destination information and delivery status updates via social media may be intercepted and used to locate a drone and a drone delivery destination. After delivery, a package is susceptible to theft or damage when left unattended. The control of a drone may be intercepted or interfered with in-flight such as by intercepting, jamming and/or imitating global positioning or Global Navigation Satellite System (GNSS) signals (e.g. pirate signals) and directing the drone to a surrogate landing zone. It should be noted that other satellite systems may provide similar satellite navigation capability, such as Global Positioning System (GPS) deployed by the U.S, GLONASS used by the Russian military, Galileo for civilian use in the European Union, and other satellite navigations systems. A drone may lose communications with GNSS or navigational systems due to terrain features, dead spots, or GNSS outage, and may become lost, thereby putting the delivery contents at risk.

Related challenges exist for verifying that a customer received a package from a drone (i.e., drone delivery verification). In conventional delivery services, particularly for expensive goods, a driver obtains a signature from the package recipient, which serves to verify that the package was properly delivered. Conventional deliveries can insure shipments and reimburse in the event of loss/theft in transit given this ability to verify delivery. The recipient's signature establishes that delivery was accomplished, and responsibility for the package shifted from the carrier and to the recipient.

SUMMARY

The various embodiments provide security for a delivery drone to prevent tampering and malicious acts by third parties. An embodiment method for providing security for a drone delivering a package of goods to a delivery destination may include providing a notification to a device of a purchaser, that the drone has arrived near the delivery destination. The drone may hover at a secure altitude from a landing zone at the delivery destination. The drone may receive a purchase code associated with a purchase of the package of goods. The drone may authenticate the purchase code as a condition for landing. The drone may land in the landing zone at the delivery destination when the purchase code is authenticated. When the purchase code is not authenticated, the drone may abort the landing in the landing zone at the delivery destination.

A further embodiment method may include releasing, by the drone, the package of goods when the purchase code is authenticated and the landing by the drone in the landing zone is complete. The drone may confirm a delivery of the package of goods when the package of goods is released. Confirmation by the drone of the delivery of the package of goods may include scanning a delivery code associated with the package of goods by the device of the purchaser and providing the scanned delivery code to a server, and capturing images of one or more of: the released package of goods, the purchaser, and the landing zone.

In a further embodiment, the purchase code may be a one-time code, and the method may further include conducting, by a server, a purchase transaction for the purchase of the package of goods with a device of a purchaser of the package of goods. The one-time purchase code may be provided by the server to the device of the purchaser of the package of goods.

An embodiment method may include guiding the drone to a landing in the landing zone using landing aids provided by a landing pad in the landing zone, which may include one or more of: a visual landing aid, an optical landing aid, and a radio landing aid.

Further embodiment methods may include navigating, by the drone, to the delivery destination using GNSS navigation or alternative navigation methods. Alternative navigation methods may include receiving a radio signal from one or more communication nodes along a travel route to the delivery destination. The radio signal may include information about the one or more communication nodes. A location of the one or more communication nodes may be determined based on the information about the communication node in the received radio signal. A position of the drone may be determined based on the determined location of the one or more communication nodes.

In an embodiment, a delivery destination may be provided to the drone, such as by the device of the purchaser providing the destination to a server that relays the information to the drone. The delivery destination may be at least one of a street address, GNSS coordinates, and a map section. An input of the map section may be received as a user input on an interactive map displayed on a user interface of the device of the purchaser.

A further embodiment method may include monitoring, by one or more of the drone and a server, one or more social media applications for an indication that drone information has been posted. One or more of the drone and the server may execute a secure navigation mode for the drone in response to the monitoring.

In various embodiments, an embodiment drone may include a memory, a radio module, a camera, a landing device, and a processor configured with processor-executable instructions to perform operations of the methods described above. An embodiment device may include means to perform operations of the methods described above. An embodiment system may include a drone, a purchaser device and a server, each with processors configured with processor-executable instructions to perform operations of the methods described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1A:
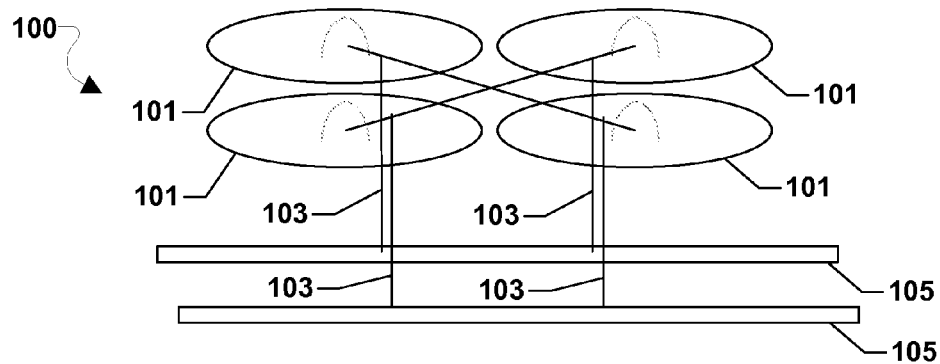
FIG. 1A-FIG. 1C are diagrams illustrating components of a drone suitable for use in the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The various embodiments facilitate providing security and delivery verification for delivery drones by having a delivery drone hover at a safe altitude until a purchase code or token is authenticated, such as in connection with a landing sequence. The various embodiments provide mechanisms that emulate security and verification characteristics of conventional manual package delivery processes but applied to unmanned drone delivery.

In various embodiments, a delivery service or goods provider (e.g., FedEx, Amazon, etc.) may accept an order for a product to be delivered. Delivery may be ordered directly from a delivery service, or may be provided in connection with purchase of goods, such as via an online vendor accepting an online order for a product. When the order or purchase is made, the purchaser's computing device (e.g., a smartphone or pad computer) may receive a purchase code or token, such as through browser or app interactions with the vendor server. The purchase code may be a simple number or hash identifying the purchase, an encrypted alpha numeric code value, an optical code (e.g., a QR code), or a combination of numbers, letters, codes, values.

As part of the order process, the purchaser may select drone delivery and specify a delivery location (i.e., landing spot for the drone). In some embodiments, the specified location may be a street address, a delivery area or zone, or the location of the purchaser's computing device. The delivery location may be specified on a map (e.g., by the user touching or clicking on a location on a street map or ground image (e.g., a Google Earth® image) or as geographic coordinates or other location oriented data. The purchaser may specify the delivery location using a user interface that may be generated by an application executing on the user's computing device or via a browser, with the user's selections communicated to server associated with the delivery service. In some embodiments, a drone delivery zone icon, which may be sized to match the map scale for the actual required landing space, may be presented so that it can be "dragged and dropped" onto a map to identify the desired delivery landing spot (e.g., purchaser's back yard).

In some embodiments, to facilitate drone security, the drone delivery service may require the purchaser to be present at the delivery zone when the drone arrives. The purchaser may use a smart device (e.g. smart phone, tablet) executing an application ("app") provided by or associated with the vendor that has a record of the purchase and drone delivery option. When the drone is deployed and nears the landing zone, a wireless message may be sent to the smart device and received via the app. The wireless message may be sent by the drone directly to the smart device (e.g., a WiFi or Bluetooth connection), or by a server associated with the delivery service (e.g., via a cellular data network connection). In some embodiments, the message may provide a notification that the delivery drone is at, is nearing, or is within range of the landing zone, and/or provide a detailed delivery time and other delivery information. The notification may prompt the purchaser to meet the drone at the landing zone.

When the drone arrives, the drone may hover above the landing zone at a stand-off altitude, such as an altitude that is high enough to avoid physical interference or tampering from the ground, but is low enough to allow point-to-point wireless communications (e.g., Bluetooth, WiFi, LTE-Direct, etc.) between the drone and the purchaser's smart device or a landing pad. When the drone hovers above the landing zone, the drone may wait for a signal from the purchaser's smart device and/or a landing pad that may be deployed in the landing zone by the purchaser indicating that landing may begin. Alternatively or in addition, the drone may wait for a signal from a server indicating that a landing sequence may begin. In some embodiments, the purchaser may press a "land now" button on a user interface of the app on the smart device to transmit the signal. The signal received by the drone may include a purchase code or token associated with the package order or purchase that the drone processor can authenticate in order to confirm that the purchaser (versus someone else) is present to receive the package. The app may receive the purchase code as part of the purchase transaction, or the code may be transmitted to the app on the purchaser's smart device via a separate message, such as from a server associated with the delivery service. The purchase code may be associated with the package, such as a one-time value associated with the package delivery. In some embodiments, the package may contain a reference to the purchase code, such as in a bar code or other optical code (e.g., QR-code, etc.). Landing may be authorized and may proceed when the code is received and authenticated by the drone. When the drone lands, it may release the package to the purchaser, perform some delivery confirmation operations to confirm that the purchaser received the package (e.g., take a photograph of the recipient and the package, receive a delivery confirmation signal from the recipient's smart device, require the purchaser to scan the optical code and remit it to the drone, receive a package receipt message from a landing pad, etc.) and depart.

In order to avoid in-flight tampering with drone navigation, such as GNSS signal tampering through pirate signals, jamming signals, or to avoid disruption of navigation through natural interference (e.g., canyons, buildings creating an "urban canyon" effect), the drone may use an alternate source of positioning signals (i.e., other than GNSS), particularly when near the designated landing zone. Because delivery drone may fly at low altitudes (e.g., below 400 feet), the drone may scan for local radio signals (e.g. WiFi signals, Bluetooth signals, Cellular signals, etc.) associated with transmitters (e.g. WiFi access points, Bluetooth beacons, Pico cells, Femto cells, etc.) having known locations. The drone may use location information associated with the source of the alternate signals together with additional information (e.g., dead-reckoning in combination with last trusted GNSS location, dead-reckoning in combination with location of the drone truck or take-off zone, etc.) for positioning and navigation. Thus, in some embodiments the drone may navigate to the delivery destination using a combination of navigation techniques, including dead-reckoning, camera-based recognition of the land features below the drone (e.g. recognizing a road, landmarks, highway signage, etc), etc. that may be used instead of or in combination with GNSS location determination and triangulation off known locations of detected wireless access points. In some embodiments, a portable landing pad with optical features, a radio beacon, or other landing aids, may be set up at the landing site by the purchaser, or the person receiving the package, to further guide the drone to its destination and landing.

The drone or server may further monitor social media, such as Facebook, or other social media for indications that one or more of the drone location, delivery status or destination is being monitored. For example, the drone or server may monitor for social media posts that are or appear to be closely tracking the drone movement, status, location or similar parameters. If so, the drone may enter a secure navigation mode. Alternatively or in addition, the drone may simply invoke measures for added security. For example, the drone may enter a secure navigation mode in which the drone may suppress the release of information about the location, destination and delivery status of the drone from social media posts or other potential sources of location, status or destination information such as emails, text messages and so on. The secure navigation mode may further involve navigating according to secure navigation modes as described in further detail herein.

As used herein the terms "drone" and "delivery drone" may refer interchangeably to an autonomous unmanned aerial vehicle. A drone may be used to deliver packages in an expedited manner, such as packages that are scheduled for delivery by a package delivery service. The drone may be owned and operated by a package delivery service, a provider of packaged goods, or a third party. Alternatively or additionally, the drone may deliver packages independently.

As used herein, the terms "landing zone," "delivery zone" may refer interchangeably to a general area of delivery such as a street address. When a drone arrives at a landing zone, further facilitation may be necessary to conduct an actual landing. For example, a drone may be directed to a backyard, a driveway or other specific landing location in order to complete the package delivery.

As used herein, the terms "landing station" and "landing pad" may refer interchangeably to a mechanism that is configured to accept, facilitate and secure landing by a drone. In some embodiments, a landing pad may be temporarily or permanently attached to a specific landing location in a landing zone. For example, a landing pad may be a flexible landing mat that is rolled out by a purchaser when the drone has arrived in or near the landing zone. A landing pad may include mechanisms to facilitate the approach and landing of a drone, including a drone laden with a package. A landing pad may optionally have the ability to attach to or secure a drone that is hovering in the vicinity of the landing pad and draw the drone in for secure attachment. A landing pad may optionally include or be associated with a secure delivery box configured to that a drone may deposit a package into a secure delivery box as part of the landing procedure. In some embodiments, a landing pad may have wireless radio, optical, or similar landing aids to facilitate accurate landing in the designating landing zone.

The various embodiments may be implemented using a variety of drone configurations. A flight power source for a drone may be one or more propellers that generate a lifting force sufficient to lift the drone (including the drone structure, motors, electronics and power source) and any loads that may be attached to the drone. The flight power source may be powered by an electrical power source such as a battery. Flight power sources may be vertical or horizontally mounted depending on the flight mode of the drone. A common drone configuration suitable for use in the various embodiments is a "quad copter" configuration. In an example quad copter configuration, typically four (or more or less) horizontally configured rotary lift propellers and motors are fixed to a frame. The frame may include a frame structure with landing skids that supports the propulsion motors, power source (e.g., battery), package securing mechanism, and so on. A package may be attached in a central area underneath the frame structure platform of the drone, such as in an area enclosed by the frame structure and skids underneath the flight power sources or propulsion units. A quad copter-style horizontal rotor drone may fly in any unobstructed horizontal and vertical direction or may hover in one place. In the examples described herein, a quad copter drone configuration is used for illustrative purposes. However, other drone designs may be used.

A drone may be configured with processing and communication devices that enable the device to navigate, such as by controlling the flight motors to achieve flight directionality and to receive position information and information from other system components including vehicle systems, package delivery service servers and so on. The position information may be associated with the current drone position and the location of the delivery destination or position information obtained regarding candidate vehicle destinations, locations of charging stations, etc.

An example drone 100 configured to deliver a package of goods to a delivery destination according to various embodiments is illustrated in FIGS. 1A through 1D. In a simple example embodiment, the drone 100 may include a number of rotors 101, a frame 103 and landing skids 105. The frame 103 may provide structural support for the motors associated with the rotors 101, the landing skids 105 and may be sufficiently strong to support the maximum load weight for the combination of the components of the drone and a package for delivery. For ease of description and illustration, some detailed aspects of the drone 100 are omitted such as wiring, frame structure interconnects or other features that would be known to one of skill in the art. For example, while the drone 100 is shown and described as having a frame 103 of a number of members, construction may use molded frame in which support is obtained through the molded structure. In the illustrated embodiments the drone 100 has four of the rotors 101. However more or fewer of the rotors 101 may be used.

Figure 1B:
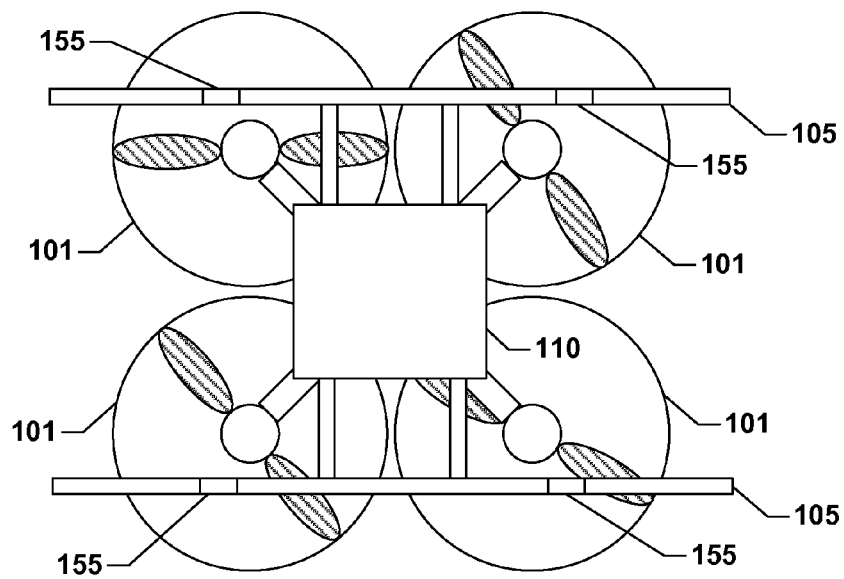

As illustrated in FIG. 1B, the landing skids 105 of the drone 100 may be provided with landing sensors 155. The landing sensors 155 may be optical sensors, radio sensors, camera sensors or other sensors. Alternatively or additionally, the landing sensors 155 may be contact or pressure sensors that may provide a signal that indicates when the drone 100 has made contact with a surface. In some embodiments, the landing sensors 155 may be adapted to provide the additional ability to charge a drone battery when the drone 100 is positioned on a suitable landing pad, such as through charging connectors. In some embodiments the landing sensors 155 may provide additional connections with a landing pad, such as wired communication or control connections. The drone 100 may further include a control unit 110 that may house various circuits and devices used to power and control the operation of the drone 100, including motors for powering rotors 101, a battery, a communication module and so on.

Figure 1C:
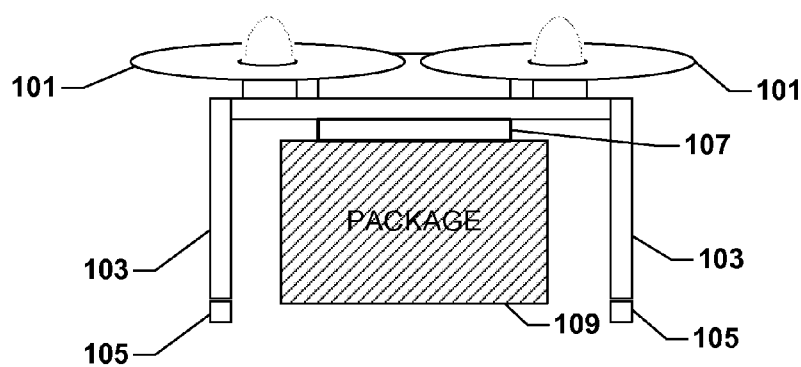

As illustrated in FIG. 1C, the drone 100 may further be equipped with a package securing unit 107. The package securing mechanism 107 may include an actuator motor that drives a gripping and release mechanism and controls that are responsive to a control unit to grip and release the package 109 in response to commands from the control unit.

Figure 1D:
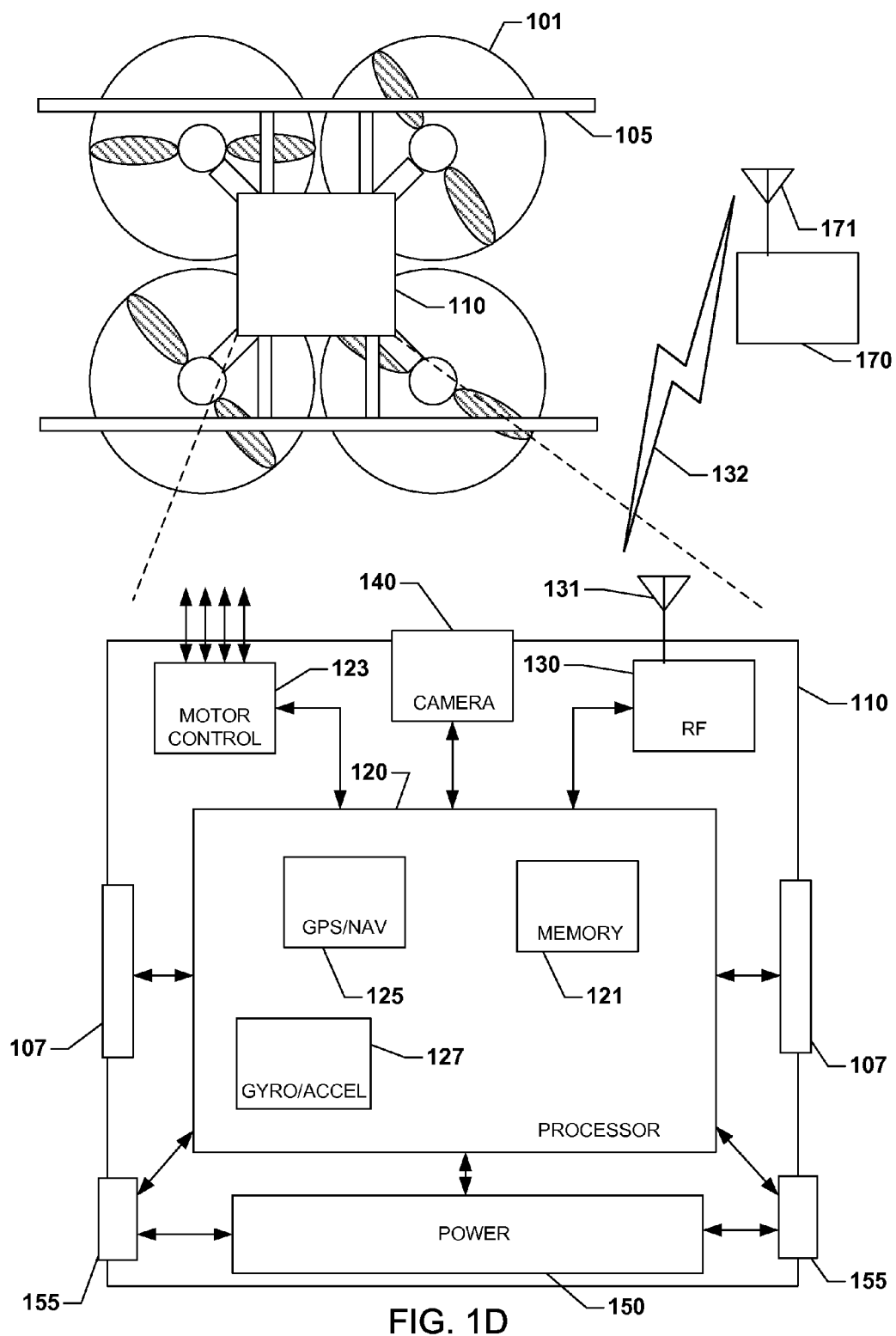
FIG. 1D is a diagram illustrating electrical and electronic components of a typical drone including a wireless communication receiver suitable for use in the various embodiments.

The drone may include a control unit 110, an example of which is illustrated in FIG. 1D. The control unit 110 may include a processor 120, a radio module 130, and a power module 150. The processor 120 may include a memory unit 121, a GNSS navigation unit 125, and sufficient processing power to conduct various control and computing operations for controlling the drone 100 and drone subsystems. The processor 120 may be coupled to the package securing unit 107 and the landing sensors 155. The processor 120 may be powered from a power module 150, such as a battery. The processor 120 may be configured with processor-executable instructions to control the charging of the power module 150, such as by executing a charging control algorithm using a charge control circuit. Alternatively or additionally, the power module 150 may be configured to manage its own charging. The processor 120 may be coupled to a motor control unit 123 that is configured to manage the motors that drive the rotors 101.

Through control of the individual motors of the rotors 101, the drone 100 may be controlled in flight toward a destination. The processor 120 may receive input from the navigation unit 125 in order to determine its present position and orientation and the location of its destination, such as the position of a landing point for delivering a package. In some embodiments, the navigation unit 125 may be equipped to navigate using GNSS signals. Alternatively or in addition, the navigation unit 125 may be equipped to navigate by receiving beacon signals or other signals from radio nodes, such as WiFi access points. The navigation unit 125 may obtain location information associated with the WiFi access points without actually establishing a communication link with the WiFi access point. In some embodiments, the navigation unit 125 may obtain information about the name of the WiFi access point (e.g., SSID) or the WiFi access point identifier (e.g., MAC address), and use that information to determine the location of the WiFi access point. For example, the SSID may be obtained from a detected signal transmitted by the WiFi access point to all devices within range. The SSID may be captured by the radio module 130 of the drone 100 and provided to a Location Information Service (LIS) which may return a location of the WiFi access point from a location database. A gyro/accelerometer unit 127 may also be provided to generate relative position information about the three dimensional orientation and movement of the drone 100 and may be used to supplement positional information to facilitate navigation.

The processor 120 may further conduct wireless communications such as with a device 170 through the radio module 130. For ease of description and illustration, the device 170 may represent a device such as a smart phone, tablet. Alternatively, or in addition the device 170 may represent a network node, such as a WiFi access point or hotspot. Alternatively, or in addition the device 170 may be a cellular network infrastructure component. Alternatively or additionally, the device 170 may be a server. In some embodiments, the drone 100 may communicate with a server through an intermediate communication link such as one or more network nodes or other communication devices. A bi-directional wireless communication link 132 may be established between transmit/receive antenna 131 of the radio module 130 and transmit/receive antenna 171 of the device 170. The drone 100 may also include a GNSS receiver configured to receive GNSS signals from positioning satellites and determine geographic coordinates from those signals. The radio module 130 may further be configured to receive navigation signals, such as beacon signals from aviation navigation facilities, and provide such signals to the processor to assist in drone navigation.

The various embodiments may be implemented within a variety of environments in communication networks, such as private networks between devices, public networks between devices, or combinations of private and public networks. A drone may travel large distances over varying terrain including roadways. Therefore, drone mobility may require communications to be maintained while the drone is travelling toward the destination.

In some embodiments the radio module 130 may be configured to switch between a cellular connection and a WiFi connection, and may be configured to maintain multiple wireless connections. For example, while in flight at an altitude designated for drone traffic, the radio module 130 may communicate with a cellular infrastructure. An example of a flight altitude for the drone 100 may be at around 400 feet or less, such as may be designated by a government authority (e.g., FAA) for drone flight traffic. At this altitude, it may be difficult to establish communication with communication devices 170 using short range radio communication links (e.g., Wi-Fi or Bluetooth). Therefore, communications with other devices 170 may be established using cellular telephone networks while the drone 100 is at flight altitude. Communication between the radio module 130 and the device 170 may transition to a short range communication link (e.g., Wi-Fi or Bluetooth) when the drone 100 moves closer to the device 170.

In the various embodiments, the device 170 may be a device associated with a purchaser who is in or near a landing zone. Alternatively or additionally, the device 170 may be located in a landing pad. The device 170 may also be a server associated with the package delivery service or operator of the drone 100. The radio module 130 may support communications with multiple devices 170.

While the various components of the control unit 110 are shown as separate components, it is also possible for at least some of the components such as the processor 120, the motor control unit 123, the radio module 130, and possibly other units, to be integrated together in a single device or chip.

Figure 2A:
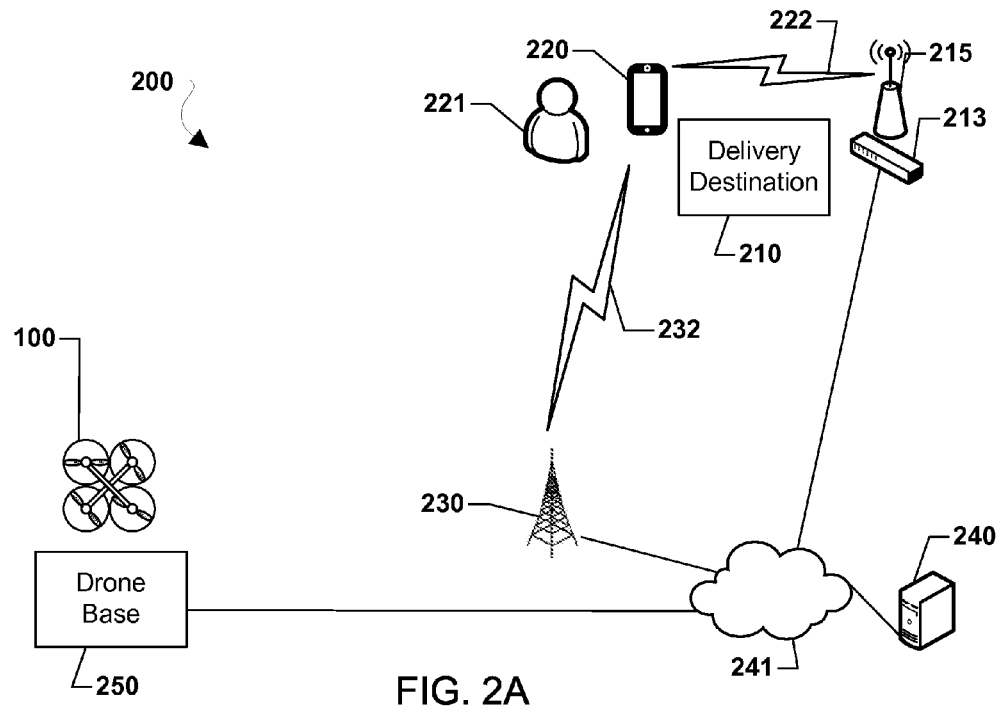
FIG. 2A-FIG. 2B are diagrams illustrating communication links in a delivery drone system between a delivery drone and system components in the various embodiments.
Figure 2B:
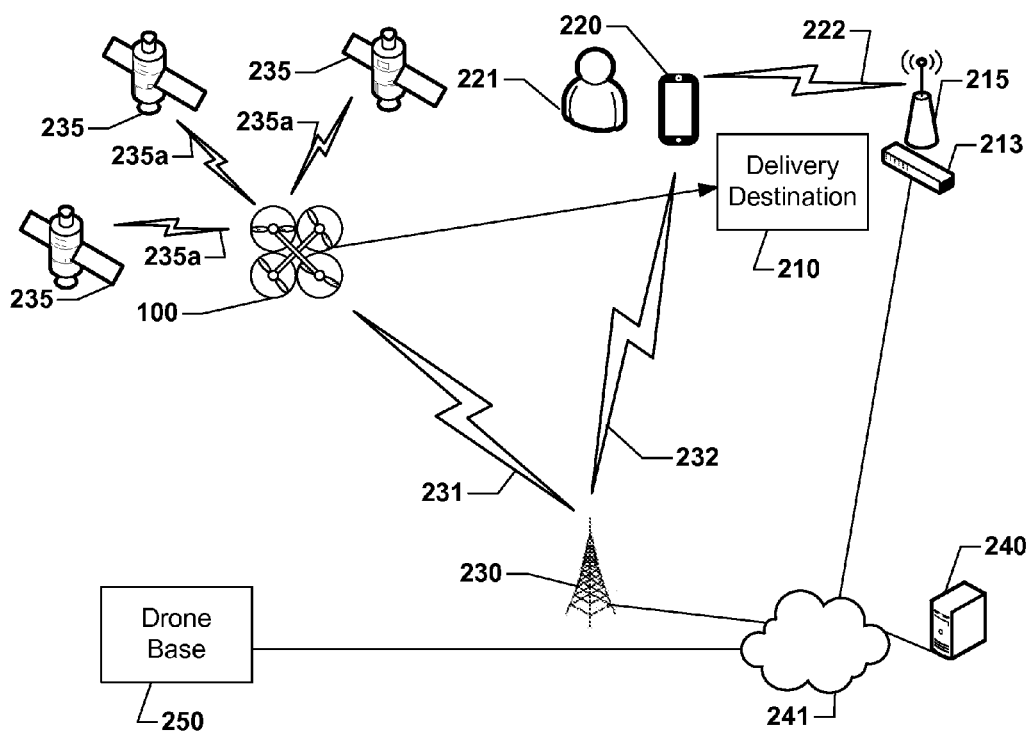
Figure 2C:
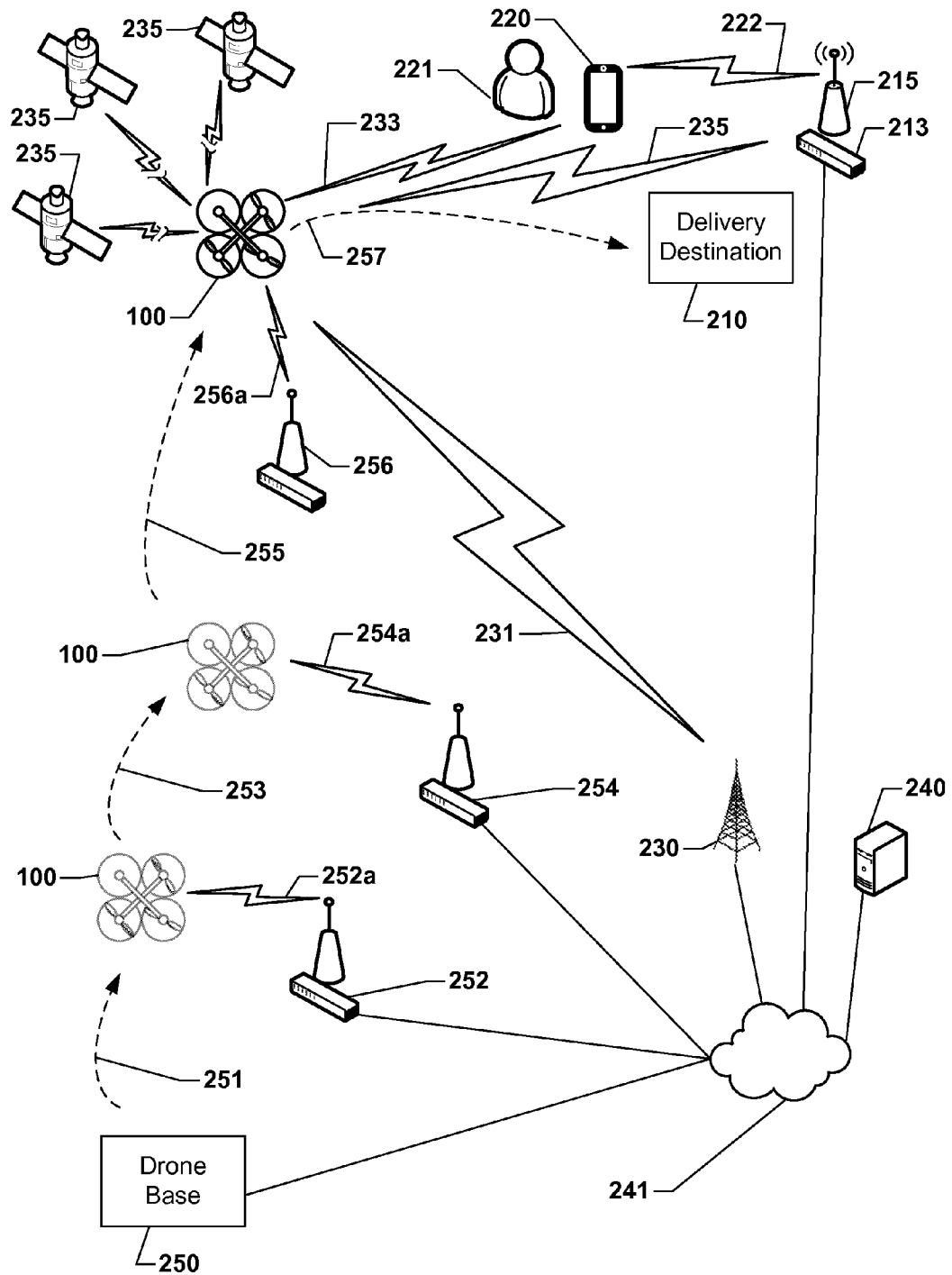
FIG. 2C is a diagram illustrating communication links and navigation links in a delivery drone system between a delivery drone and system components in the various embodiments.

In the various embodiments, an operating environment 200 for the drone 100 may include a delivery destination 210 and a drone base 250 as illustrated in FIG. 2A through FIG. 2C. For example, as illustrated in FIG. 2A, a delivery destination 210 may be provided to the system when an order is placed on line for a particular product and drone delivery is requested. In some embodiments, the drone 100 may be programmed with the delivery destination 210, such as when a particular drone 100 is assigned for delivery and the product is gripped by the package securing unit 107. The drone 100 may be in communication with the server 240 while it is at the base station 250 to facilitate the dispatch of the drone 100 with the delivery address of the delivery destination 210. At the delivery destination 210, a user 221, such as the purchaser, may be present with a device 220, such as a smart phone or tablet that is executing an application for purchasing and receiving delivery of the package. The device 220 may establish a wireless connection 232 with a cellular infrastructure component 230 of a cellular service provider. The connection 232 may be a data connection that may further facilitate a connection with the server 240 through a public network, such as the Internet 241. Alternatively or in addition, the device 220 may establish a wireless connection 222 with an access point 213 having an antenna 215. The access point 213 may have an independent connection to the Internet 241, which may provide a connection to the server 240.

The drone may receive the delivery address of the delivery destination 210 and may be dispatched from the base station 250 with the package 109. The drone 100 may proceed to fly from the drone base 250 to the delivery destination 210 with the package. The drone 100 may proceed along a programmed route from the base station 250 to the delivery destination 210. Alternatively or additionally, the drone 100 may determine its own route based on various constrains, such as altitude, obstacles, weather conditions, retrievability considerations. For example, in the event the drone 100 lands or crashes while traveling to or from its destination, the drone 100 may be configured to do so in an area that will be least likely to cause safety issues to humans or damage to property, and/or in an area where it can be most easily retrieved, and so on. The drone 100 may use GNSS signals 235a from GNSS satellites 235 to determine its progress toward the delivery destination 210, including progress towards way points. The drone 100 may establish a connection 231 with the cellular infrastructure component 230 to facilitate communications with the server 240 through the Internet 241 while en route.

In the event the drone 100 loses contact with GNSS satellites 235, either through jamming or pirate signals, or the presence of natural obstacles, the drone 100 may resort to alternative navigation. In some embodiments, the drone 100 may use alternative navigation methods in addition to GNSS based navigation. For example, both GNSS and alternative navigation methods may be used together so that navigational continuity may be preserved in the event one of the navigation methods fails. As illustrated in FIG. 2C, the drone 100 may receive signals from the wireless network access points 252, 254, 256 through respective wireless signals 252a, 254a, 256a as it progresses toward the delivery destination 210. The signals 252a, 254a, and 256a may be beacon signals or other wireless signals transmitted from the access points 252, 254, 256. Such signals may provide information about the respective access points 252, 254, 256, such as a service sector identification (SSID), media access control (MAC) address, and so on. The information may be used by the drone processor to determine the locations of the access points 252, 254, 256, such as by comparing the identifiers to a database of the locations of access points. For example, when the drone 100 is dispatched from the base station 250 on a first leg 251, it may encounter a first signal 252a from a first access point 252. The first signal 252a may contain the SSID of the first access point 252 and possibly other information such as the MAC address of the first access point 252. The drone 100 may have an established communication link 231 with the server 240 through the cellular network infrastructure 230 and the Internet 241. The drone 100 may submit the SSID and MAC address of the access point 252 to the server 240 or the Internet 241 to look up a listed location of the first access point 252 through a location information services service. The location information services provider may return the currently listed location of the first access point 252. When the location is received, the drone 100 may use the location information of the first access point 252 to confirm its current location and proceed toward the delivery destination 210 on a second leg 253. The drone may repeat the operations with the second access point 254 when it encounters its second signals 245a, by obtaining the SSID and possibly other information about the second access point 254 and submitting the information to a location information services provider. The location information returned from the location information services provider may be used to confirm the current location and bearing of the drone 100. In the event the location information indicates that the drone 100 is off course, the drone 100 may make course corrections as it proceeds to the delivery destination 210 along a third leg 255 and/or choose to distrust the GNSS signal as it may be pirate signal and fall back onto dead-reckoning navigation in combination with alternative navigation. The location information determination operations may be repeated with the third access point 256, and so on.

As the drone 100 approaches the delivery destination 210 along a final leg 257, a communication link 233 may be may be established with the user's device 220. Alternatively or additionally, the drone 100 may detect a signal 235 from access point 213, and conduct a final location determination operation with the access point 213 information. Alternatively or additionally, the drone 100 may use the connection 235 to establish a connection with the server, such as through the Internet 241 by way of the access point 213. Alternatively or additionally, the drone 100 may use the connection 231 to establish a connection with the server, such as through the Internet 241 by way of the cellular infrastructure component 230. Through such connection, the drone 100 may receive additional navigational, status, or other information useful for supporting the delivery operations including, for example, modified destination information, modified route information, weather information, distance information, flight restriction information, obstacle information, or other information that may be useful for delivery operation. For example, the purchaser may have moved to a new destination and may have modified the delivery destination. The new destination information may be conveyed to the drone 100 through one or more of the wireless connections 231, 233, and 235. In particular, if the delivery destination is associated with "finding" the device 220, then as soon as the device is discovered and the drone 100 connects with the device 220, further direction information may be provided to allow the drone 100 to take up a hover position at a stand-off or hold-off distance or altitude in preparation for landing and delivery. The hold-off distance may be at a flight altitude or at a lower altitude that prevents interception of the drone by a malicious actor.

Figure 3A:
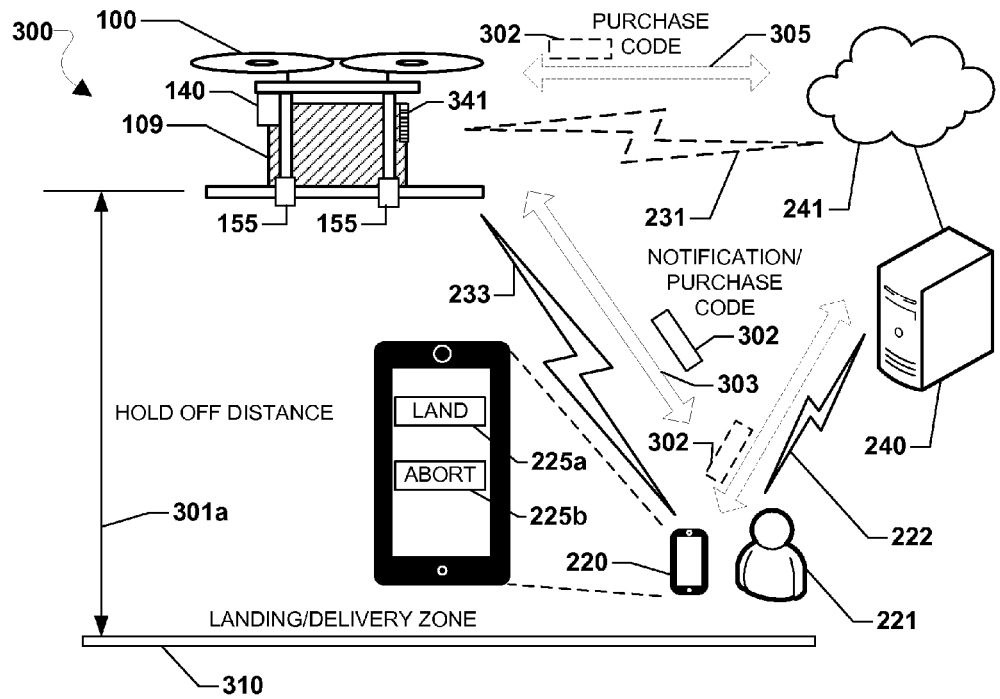
FIG. 3A-FIG. 3F are diagrams illustrating a drone landing, delivery of a package and departure of a delivery drone.

As illustrated the landing scenario 300 of FIG. 3A, the drone 100 may hover at a hold-off distance 301a over the landing zone 310. The hold-off altitude 301a may be at a flight altitude, such as around 400 feet. However, to avoid the possibility of interfering with other drones that may be flying at the flight altitude near the drone 100, the hold-off distance 301a may be at a lower altitude. The lower altitude may be sufficiently low to avoid interfering with other drones in flight, but sufficiently high to avoid obstructions such as trees or structures and to avoid being captured by anyone intent on intercepting the delivery. Considerations for avoiding tampering may include establishing a lower hold-off altitude 301a that still is high enough to avoid tampering using a pole, extension, or other object that a malicious actor could use in an attempt to reach the drone.

The drone 100 may establish the wireless connection 233 with the device 220 of the user or the purchaser 221. Alternatively or additionally, the drone 100 may establish the wireless connection 231 with the server 240 through the Internet 241 and intervening access devices. The device 220 may further have a communication connection 222 with the server 240, such as through a wireless access point and the Internet 241 as previously described. When the drone 100 is in the hover position near the landing zone 310, the device 220 may receive a notification in a message exchange 303, from the drone 100, from the server 240 or a combination of the drone 100 and the server 240, such as through the connection 222 and/or connection 233. The notification in the message exchange 303 may indicate that the drone 100 is ready to land and deliver the package 109. The purchaser 221 with the device 220 may move to the landing zone 310 to assist landing and take delivery of the package 109. The device 220 may be executing an application associated with the vendor and/or delivery service. The notification may be received by the device 220 through the application.

When the device 220 receives the notification in the message exchange 303, the purchaser 221 may be prompted by the application to instruct the drone 100 to land, such as by providing a "LAND" soft button 225a provided on the user interface of the application. Alternatively or additionally, hard buttons (not shown) may be designated for providing landing instructions or other instructions. By pressing a button or virtual key to send a LAND instruction from the device 220, the purchaser 221 may confirm to the drone that the landing zone 310 is clear of any obstructions and instruct the drone 100 to land.

In connection with providing the LAND instruction, the device 220 may provide a purchase code 302 or token received from the server 240 in connection with the purchase in the message exchange 303. In some embodiments the purchase code 302 may be provided to enable/authorize additional actions, such as in order to inform the drone that the purchaser 221 is authorizing the LAND instruction. While the message exchange 303 is illustrated and described as an exchange for simplicity, a notification message, a land instruction with the purchase code 302, and other instructions and messages may be transmitted separately by respective devices.

The drone 100 may receive the purchase code 302 through the wireless communication link 233. Alternatively or additionally, the purchase code 302 may be provided to the drone 100 indirectly through the communication connection 222 to the server 240, and then from the server 240 to the drone 100 through the wireless connection 231. Depending on the hold-off distance 301a and the nature of the communication protocols used to establish the communication link 233, direct communication between the device 220 and the drone 100 may not be possible. For example, the connection 233 may rely on a short range protocol, such as Bluetooth (BT), BT Low Energy, or other short range protocol. The hold-off distance 301a may exceed the range of the radio module 130 for the short range protocol. In such an instance, the communications between the device 220 and the drone 100 may accomplished indirectly, such as through a cellular communication network, such as the wireless connections 222 and 231.

In some embodiments, the drone 100 processor may receive the purchase code 302 over the communication connection 233 and authenticate the purchase code 302, such as by comparing the received number to a number stored in its memory. In other embodiments, the drone 100 may receive the purchase code 302 over the connection 233 and pass the purchase code to the server 240 through the connection 231 for authentication. In other embodiments, the server 240 may receive the purchase code 302 over the communication connection 222 and authenticate the purchase code 302. The server 240 may receive the purchase code 302 along with metadata indicating that the device 220 is at the landing zone 310. The server 240 authenticates the purchase code 302 and notifies the drone of a successful authentication over communication connection 231.

Figure 3B:
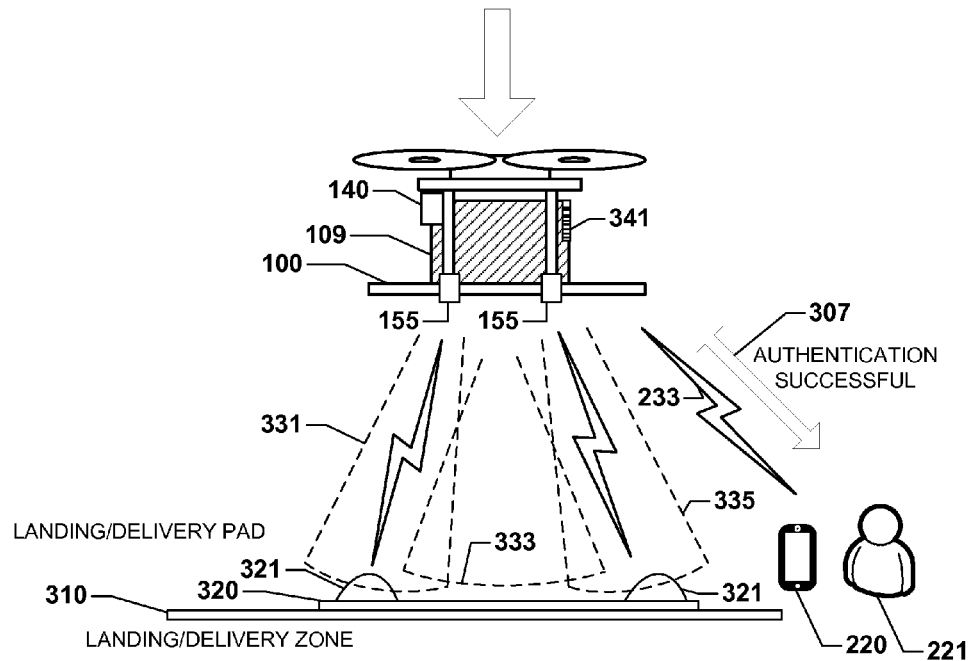

As illustrated in FIG. 3B, when the purchase code is authenticated, the drone 100 may provide an indication that the authentication was successful in a message exchange 307 with the device 220. In some embodiments, the authentication may be performed independently and, upon receiving the indication of successful authentication, the device 220 and the purchaser 221 may provide a LAND instruction, such as by activating the LAND soft button 225a. In some embodiments, the drone 100 may initiate a landing sequence when the land instruction is received with the purchase code and the purchase code is successfully authenticated. The drone 100 may initiate a landing sequence in order to land in the landing zone 310 to deliver the package 109. In some embodiments, the purchaser 221 may provide a landing pad 320 at the time of delivery to facilitate landing of the drone 100. Alternatively, the landing pad 320 may be permanently or semi-permanently fixed in a position in the landing zone 310 to provide a dedicated place for drone landings.

The landing pad 320 may include landing aids 321, which may be radio landing aids, optical landing aids, other landing aids or a combination of landing aids. The drone 100 may be provided with devices, such as landing sensors 155, which may be configured to observe or interact with the landing aids 321 to provide a more precisely guided landing. In some embodiments, the landing sensors 155 may include optical sensors, radio sensors, camera sensors, radar, ultrasound ranging sensors, or other sensors.

The drone 100 may be further equipped with a camera 140 configured to allow the drone to observe landing aids 321 and to capture images of the landing sequence. The camera 140 may additionally capture images of the purchaser 221 for the purpose of additional authentication, such as by facial recognition. The camera 140 may provide additional authentication by scanning an optical code, such as a bar code or QR code that may be displayed or presented from the device 220 by the application (e.g., application user interface display, etc.) as part of the landing sequence.

Figure 3C:
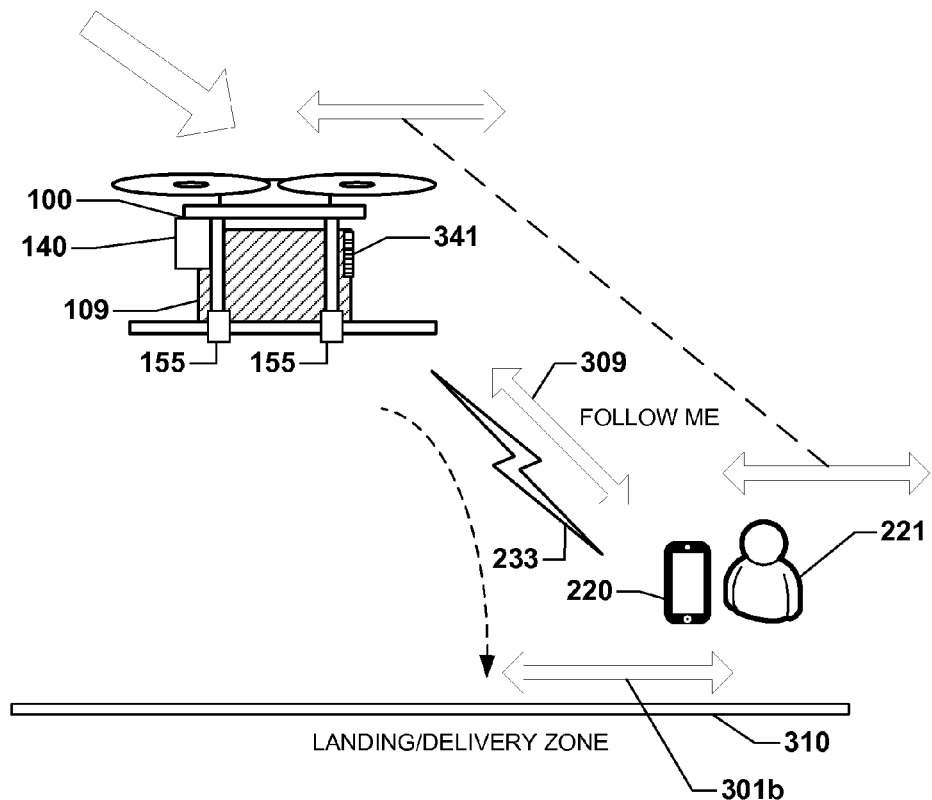

In some embodiments, as illustrated in FIG. 3C, the drone 100 may proceed to a particular point or area in the landing zone 310 based on following the device 220 as the purchasers 221 moves about in the landing zone 310. For example, the device 220 may send a FOLLOW ME instruction or command to the drone in a message exchange 309 with the drone 100. The drone 100 may use various techniques to follow the purchaser 211 such as image processing of images obtained by the camera 140. In other embodiments, the drone 100 may follow a radio signal from the device 220. In other embodiments, the drone 100 may follow location information associated with the device 220, or by other methods. The drone 100 may establish a safety zone by landing at and/or maintaining a stand-off distance 301b such that the drone 100 does not collide with the purchaser 221.

Figure 3D:
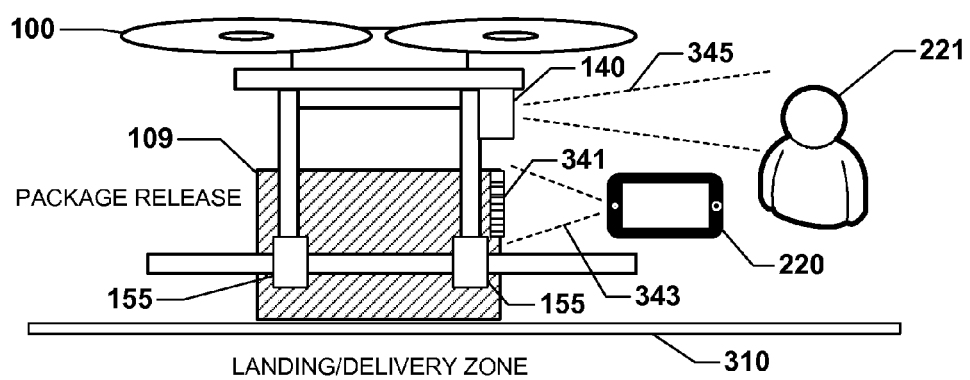

In some embodiments, as illustrated in FIG. 3D, the drone 100 may land on the landing zone 310. In some embodiments, as described, the landing may be with the landing pad 320. In other embodiments, the landing may be without the landing pad 320. The drone 100 may land and release the package 109. The package 109 may be released based upon authenticating the purchase code 320. The package 109 may be released based on signals including a control signal and, optionally by signals from the landing sensors 155 indicating that the drone 100 has landed. In some embodiments in which the landing sensors 155 include pressure sensors, the landing sensors 155 may be configured to detect that the complete weight of the package 109 and the drone 100, or a proportion of the complete weight, are on the landing gear, thereby indicating a successful landing.

In some embodiments, the drone 100 may perform additional operations before releasing the package 109. For example, the camera 140 may capture an image of the purchaser 221 for further authentication, such as facial recognition. Alternatively or additionally, the camera 140 may capture a code, such as a bar code or QR code displayed on device 220 to provide further authentication, or for other purposes. The camera 140 may capture an image of the purchaser 221 within an optical field 345 to provide a record of who actually received the package 109, and that the package 109 was actually received by someone.

In some embodiments, the package 109 may be provided with a delivery code 341, such as in the form of a label on the package 109, such as a bar code, a QR code, or other optical code. The delivery code 341 may be the purchase code 320. The delivery code 341 may be derived from the purchase code 320, or a different code, such as a delivery acceptance code. The delivery code 341 may be encoded into a radio frequency label (e.g., RFID). The device 220 may scan the code with a scanner 343 such as with a camera associated with the device 220. When the device 220 scans the delivery code 341, delivery may be "accepted" and the drone 100 may release the package 109. Alternatively, the drone 100 may release the package and the purchaser 221 may inspect the contents and scan the delivery code 341 when the contents are found to be intact. Other transactional operations are possible using combinations of the camera 140, the device 220 and the delivery code 341, and other components of drone 100. For example, if the contents are found to be defective or not what was ordered, the device 220 may issue a command to return the package 109. Alternatively or additionally, the device 220 may not scan the delivery code 341 indicating that delivery is refused.

Figure 3E:
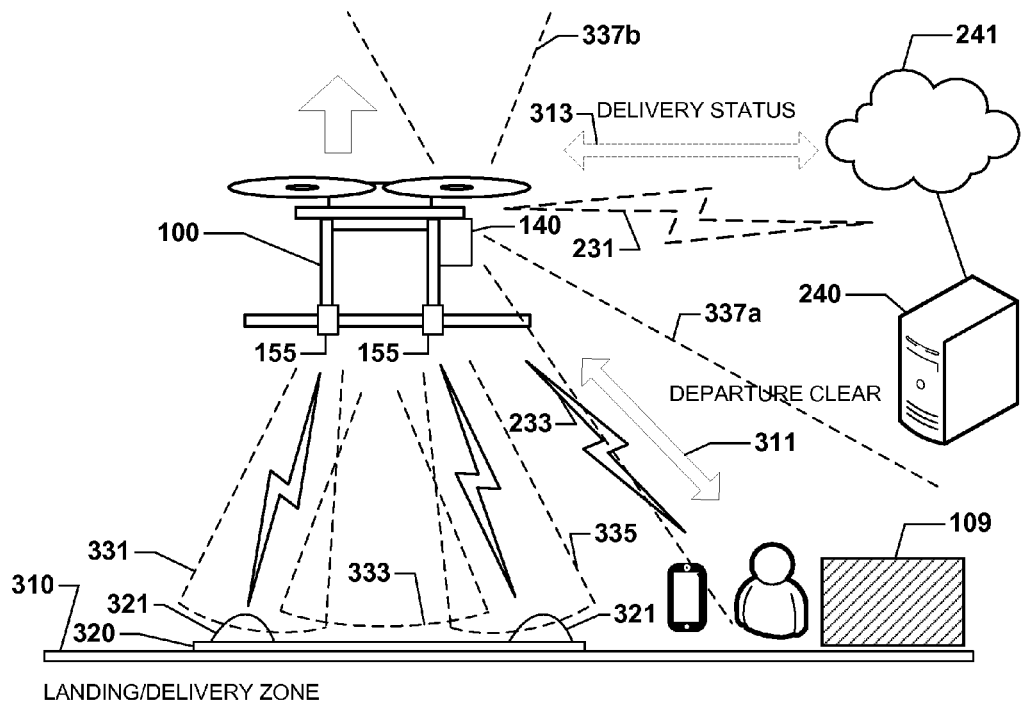

In some embodiments, as illustrated in FIG. 3E, when the package 109 is delivered, the drone 100 may depart from the landing zone 310. The drone 100 may report the delivery status to the server 240 in a message exchange 313. The message exchange 313 may indicate to the server 240 that the package 109 was accepted for delivery by the purchaser 221, such as by scanning the delivery code 341. The drone 100 may receive an instruction in a message exchange 311 with the device 220 that the departure is clear. The drone 100 may initiate a departure sequence to ascend to a flight altitude. The flight altitude may be the hold-off altitude 301a or another flight altitude. Although the drone may be unloaded after delivery of the package 109, it may nevertheless be advantageous for the drone 100 to ascend to an altitude that is sufficient to avoid tampering.

The drone 100, when departing, may make further use of the landing aids 321 to guide departure. Further, when departing, the drone 100 may capture additional images in an image field 337a, such as by using the camera 140. The additional images may be used to verify that the purchaser 221 accepted delivery of the package 109, such as by showing the purchaser 221 together with the package 109. The additional images may also be used to assist in departure navigation. In some embodiments the camera 140 may be configured to capture upward facing images in an image field 337b that may allow the drone 100 to avoid any obstacles such as tree branches, structures, or other obstacles. The landing sensors 155 may further be used during departure for monitoring, capturing, and collecting data associated with the area above the drone 100. For example, the landing sensors 155 may detect obstacles or obstructions above the drone 100 in the departure path. In some embodiments, aids may be positioned in an area or areas above the landing zone to provide an indication of a safe departure (or landing) path. For example, if many trees, tree branches or other obstructions exist between the stand-off altitude and the landing zone, a path through the obstructions may be marked with aids. Aids may include optical aids, radio aids, and so on.

Figure 3F:
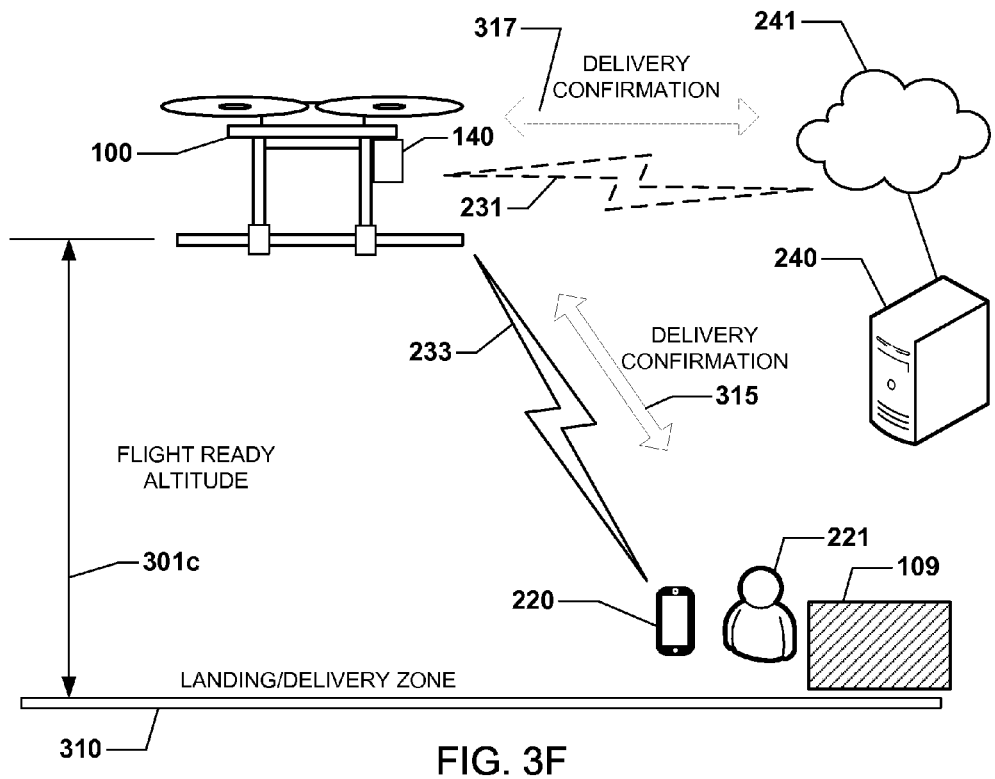

In some embodiments as illustrated in FIG. 3F, when departing the drone 100 may attain a flight ready altitude 301c. For example, the drone 100 may depart to the flight ready altitude 301c when cleared by the purchaser 221. In some embodiments, the flight ready altitude 301c may be the same as the hold-off distance 301a, or may be different. The flight ready altitude 301c may be the actual flight altitude designated for drone flight. Alternatively or additionally, an intermediate altitude or altitudes that may be set as the flight ready altitude 301c. For example, as part of a departure sequence, the drone 100 may attain one or a series of flight ready altitudes 301c before attaining the designated flight altitude.

When the flight ready altitude 301c is reached the drone 100 may engage in a delivery confirmation communication exchange 315 with the device 220 over the connection 233. The exchange 315 may also be conducted while the drone 100 is attaining the flight ready altitude 301 c. The delivery confirmation communication exchange 315 may involve the drone 100 confirming that one or more delivery operations have been successfully performed. For example, the drone 100 may confirm that the package 109 has been released, that delivery of the package 109 has been accepted by the purchaser 221 (e.g., package 109 has been scanned), that an image of the purchaser 221 and the package 109 has been captured, that a secondary authentication of the purchaser 221 has been performed and so on. Alternatively or additionally, combinations of the delivery confirmation operations may be conducted.

Delivery confirmation may also include confirming delivery with the server 240, such as through a message exchange 313 via the wireless connection 231 and the Internet 241. In some embodiments, the drone 100 may receive the purchase code 320, the delivery code 341, captured images, and so on and forward this information to the server 240. The server 240 may verify the information and return a confirmation to the drone 100. The drone 100 may provide a confirmation message to the device 220. In other embodiments, the drone 100 may be equipped to receive one or more of the purchase code 320, the delivery code 341, the images and other information, and provide immediate confirmation. The confirmation may be reported to the server 240 immediately, or as soon as communications are established. In still other embodiments, the device 220 may establish a connection with the server 240, such as through an application, and provide the information directly to the server 240. Delivery confirmation may be passed from the server 240 to the drone 100, to the device 220 or a combination.

Figure 4A:
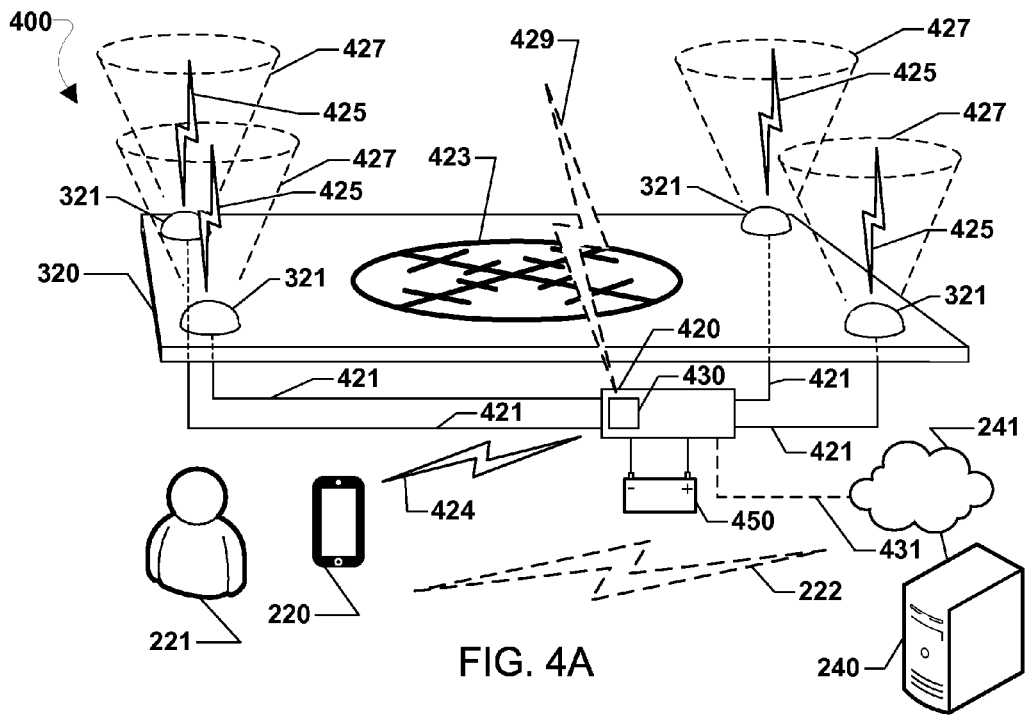
FIG. 4A-FIG. 4B are diagrams illustrating components of a landing pad for facilitating drone landing in the various embodiments.

In the various embodiments, the landing pad 320 may be provided with additional mechanisms to facilitate landing, as illustrated in FIG. 4A. For, example, in the illustrated embodiment 400, in addition to the landing aids 321, the landing pad 320 may be provided with a landing controller 420, a radio module 430 and a landing marker 423. The landing controller 420 may be coupled to the landing aids 321 through lines 421, which may be one or more of power, communication and control lines. Some or all of the components of the landing pad 320 may be powered by a power supply 450, which may include a battery. The landing marker 423 may provide an optical feature such as a visible landing target to guide the drone 100 to a more precise landing during a landing sequence. For example, in addition to using the landing aids 321, the drone 100 may use the camera 140 to find the landing marker 423 and use it to more precisely guide the landing.

The landing aids 321 may include optical landing aids, radio landing aids or a combination thereof. In some embodiments, the landing aids 321 may be emitters only, or may be a combination of shapes, emitters, receivers, and sensors. In some embodiments, each of the landing aids 321 may have an optical zone 427 that emits an optical signal such as a directional or non-directional infrared beacon. Further, each of the landing aids 321 may have a radio signal 425, such as a directional or non-directional radio beacon or signal. The optical signal and the radio signal may be unidirectional or bi-directional. When the optical signals are bi-directional, the optical signal and the radio signal may function as sensing signals. Further, the optical signal and the radio signal may function as communication links. The drone 100 using the landing sensors 155, may couple to the landing aids 321 such that a guided landing is facilitated. The drone 100 may obtain position and ranging information from the landing aids 321, which may inform the drone 100 of its proximity with the landing pad 320, a rate of descent, a relative position with respect to the landing pad, or other information. The drone 100 may use the landing aids 321 together with, or independently from, the landing marker 423.

In some embodiments, the landing pad 320 may conduct communications with the drone 100, the device 220 or other devices through the radio module 430. For example, the landing pad 320 may establish a wireless connection 429 with the drone 100, such as through the radio module 430, for the purpose of communicating landing related information, or other information. Alternatively or additionally, the landing pad 320 may establish a connection 424 with the device 220. Information communicated between the landing pad 320 and one or more of the server 240, the drone 100, and the device 220, may further include communications related to purchase and delivery authentication and confirmation as described above. The landing pad controller 420 may further have a connection 431 with the Internet 241, which may provide a connection to the server 240.

Figure 4B:
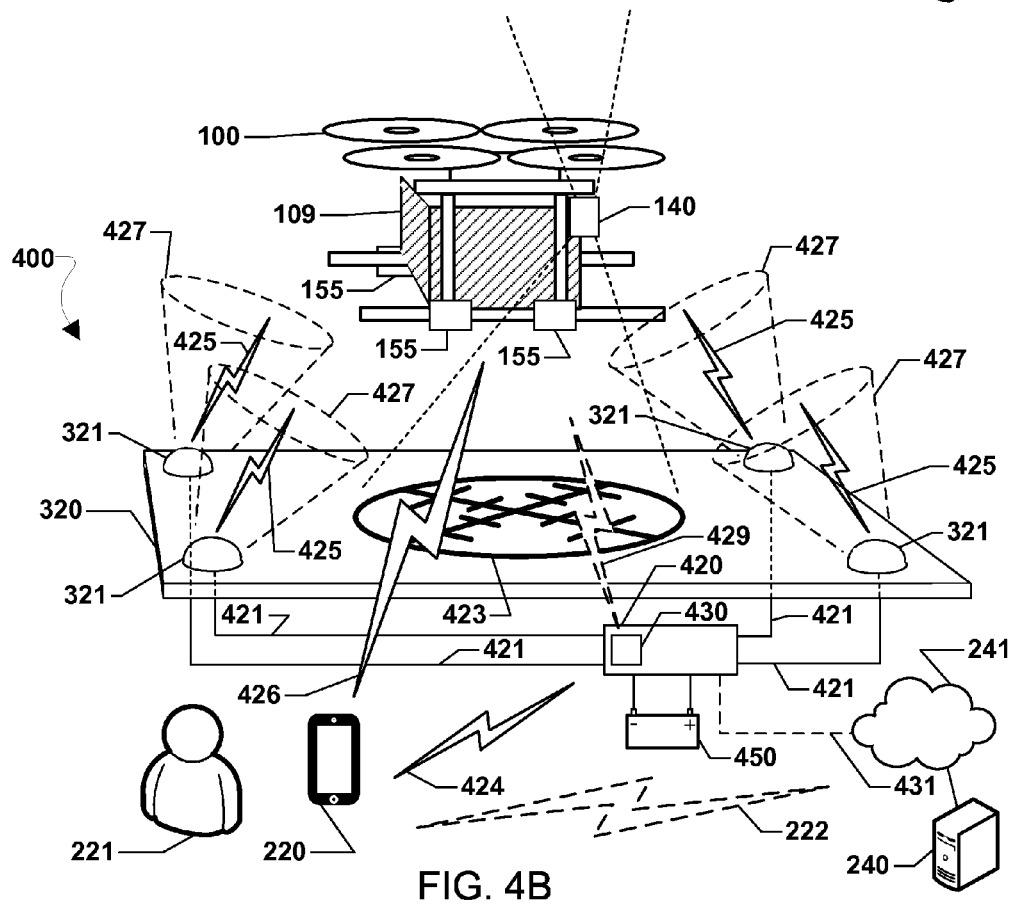

As illustrated in FIG. 4B, when the drone 100 descends (or ascends) the landing aids 321 may continue to provide guidance to the drone 100. For example, the landing aids 321 may adapt to the position of the drone 100 as it descends or ascends and provide periodic or continuous guidance. The drone 100 may additionally track its descending or ascending path by monitoring the landing marker 423, such as by using the camera 140. As discussed, the landing camera 140 may be used by the drone 100 to monitor in an upward direction during ascent to ensure that obstacles are avoided. The drone 100 may descend independently using the landing aids 321 as guidance. Alternatively or additionally, the drone 100 may surrender landing control to the landing aids 321 and be guided by the landing aids 321.

Figure 5A:
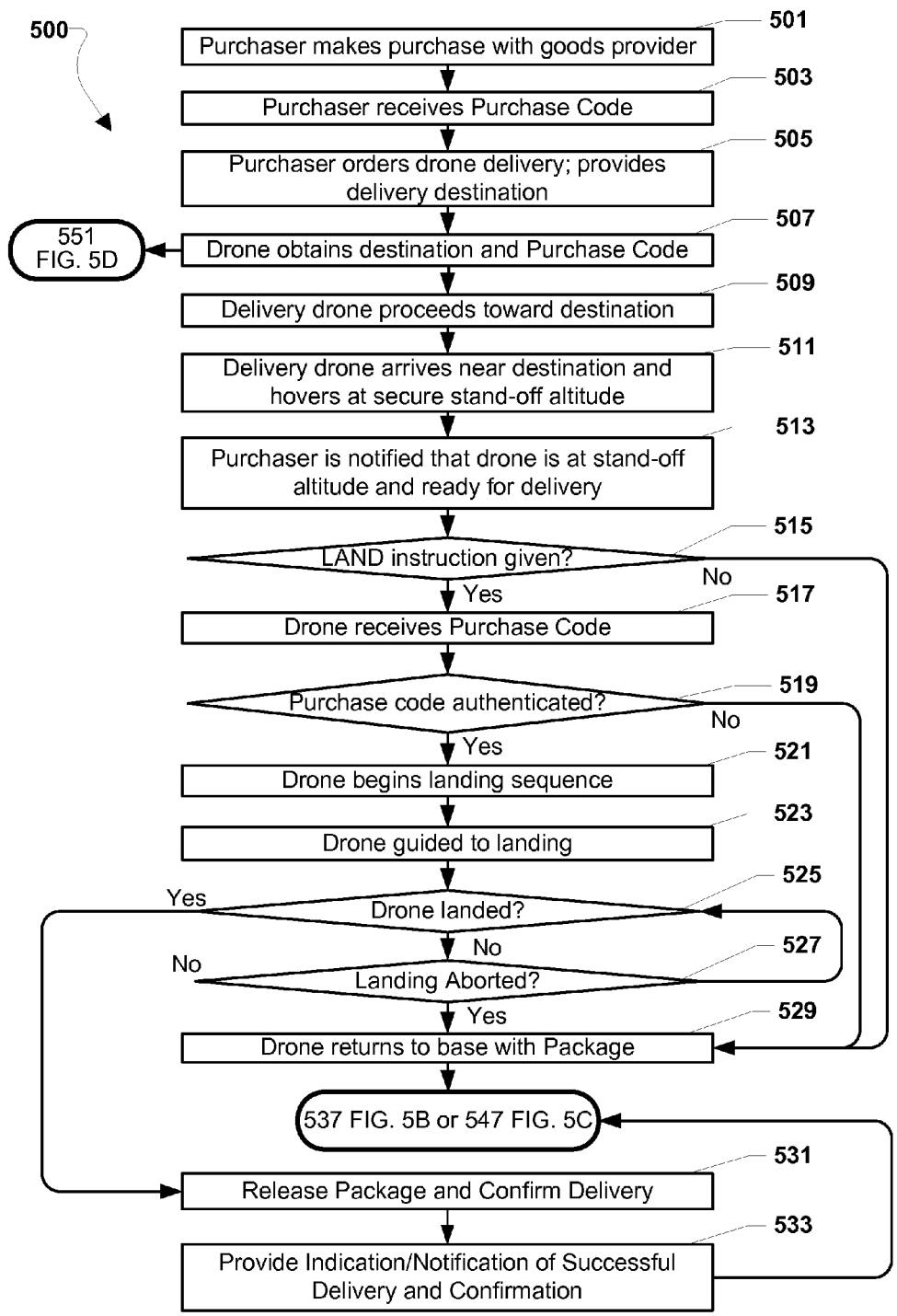
FIG. 5A is a process flow diagram illustrating an embodiment method for providing drone security including authenticating a purchase code for landing at a delivery destination.

An embodiment method 500 for operations of the drone 100 is illustrated in FIG. 5A. To perform the operations of the embodiment method 500, wireless communication links may be established between one or more of the drone 100, the device 220, the server 240, and the landing controller 420, with such link used to exchange information to facilitate secure package delivery as described herein.

In block 501, a processor in the device associated with the purchaser may make a purchase from a goods provider. The processor may execute an ordering and delivery application that facilitates the secure purchase of goods from the goods provider. The ordering and delivery application may establish a connection with the service provider. The connection may be a direct connection to the goods provider or may be a connection that is at least partially conducted over a network such as the Internet to a portal to the goods provider based on a location address of the goods provider (e.g., URL). Alternatively, the processor may execute a secure browsing application or browser that facilitates a secure purchase. In some embodiments, the processor may communicate with the goods provider through an access portal, such as through the Internet. The processor may establish a secure connection for facilitating a secure purchase transaction. The secure connection may allow the secure exchange of sensitive information including the purchaser's account information, confirmation information provided by the goods provider, and other information.

In block 503, the processor in the device associated with the purchaser, may receive a purchase code. The purchase code may be a one-time code generated, such as by a server processor of the goods provider server, that is bound to the purchase transaction that identifies the transaction. The purchase code may alternatively be generated by a third-party transaction management service and passed to the goods provider, directly to the purchaser or a combination thereof The purchase code may be generated and received by the processor when a purchase transaction has been completed. For example, the purchase code may be generated when a credit card or other account is successfully charged for the purchase of goods. The purchase code may be used for further authentication of the transaction when the package is delivered as described herein.

In block 505, the processor of the device associated with the purchaser may order drone delivery of the purchased product. The processor may order drone delivery as part of the purchase transaction, such as by selecting or indicating drone delivery in connection with the purchase transaction. Alternatively, the processor may order drone delivery in a separate step. The processor may alternatively order drone delivery separately from a third party delivery service. Even in instances where drone delivery is ordered as part of the purchase transaction with the goods provider, the drone delivery may be conducted by a third party. In some embodiments, such as when drone delivery is ordered separately, the processor may use the purchase code to identify the transaction on which the drone delivery may be based.

In block 507, when the drone delivery is ordered, the drone processor may obtain the delivery destination. In some embodiments, the processor of the purchaser's device may be executing a drone delivery application that may be used to designate the delivery address. The processor of the purchaser's device may facilitate the purchaser to interact with the application and designate the delivery destination, such as by entering text. The processor of the purchaser's device may facilitate interacting with a map display, to "drag and drop" the delivery destination or otherwise designate the delivery destination on the map display. The delivery destination may be designated as a street address, GNSS coordinates, or as a landing zone on the map display. In further embodiments, as described in connection with FIG. 5D, the processor of the drone may use additional navigation methods as an alternative or supplement to GNSS navigation.

In some embodiments, a server of the goods provider may have delivery information pre-stored, such as from previous transactions. Confirmation of the delivery address may be conducted during the purchase transaction. The processor of the drone may further be provided with the purchase code such that the purchase code provided by the purchaser at the time of delivery may be authenticated. Alternatively, the drone may proceed to the delivery destination and the purchase code may be authenticated remotely by the server at the time of delivery, such as when received from the purchaser's device.

In block 509, the processor of the drone may direct the drone toward the delivery destination. For example, the processor of the drone may dispatch the drone to the destination from a fulfillment center or base station where the drone may be loaded with the package. Alternatively, the processor of the drone may dispatch the drone from a drone base to a warehouse or fulfillment center where the package may be loaded. The processor of the drone may direct the drone to a designated flight altitude and to a route for proceeding to the delivery destination. The processor of the drone may control the flight motors and rotors in order to proceed toward the destination along a route. The route may be fixed so as to coincide with major roadways so as to avoid possible obstruction and provide a convenient location in the event the drone must land immediately, such as in the event of a failure. Alternatively or additionally, the processor may control the drone in a straight line flight route toward the destination, or a combination of a straight line route and a route that passes over roadways.

In block 511, the processor of the drone may arrive near the delivery destination. The processor of the drone may control the drone to hover at a stand-off altitude that is sufficiently high to avoid tampering, while being sufficiently low to be out of the drone flight traffic corridors. In some embodiments, the stand-off altitude may be too high to establish short range communications with devices on the ground. In such embodiments, the drone may maintain communications with the server through cellular data network connections. Alternatively or additionally, the processor of the drone may establish communication links with medium range devices, such as WiFi access nodes. For example, a WiFi access node may be available at the residence of the purchaser. Assuming the delivery destination is at the residence of the purchaser, a connection to the device of the purchaser may be established through the WiFi access node. The processor of the drone may transition between different connections (e.g., cellular, short range, medium range) when conditions allow.

In block 513, the processor of the drone may notify the purchaser's device that it has arrived near the delivery destination. The processor of the drone may indicate that it is awaiting further instructions for landing. Alternatively, such as in the event that direct communication may not be possible with the processor of purchaser's device, the processor of the drone may notify the server that it has arrived near the delivery destination. The server may pass the notification to the processor of purchaser's device, such as through the drone delivery application executing on the processor of the purchaser's device, which may maintain a connection with the server. In some embodiments, the processor of a landing pad may communicate with the processor of the purchaser's device and the processor of the drone and the notification may be provided indirectly through connections associated with the processor of the landing pad.

In determination block 515, the processor of the drone may determine whether a LAND instruction has been given, such as by receiving the LAND instruction through a communication connection. The LAND instruction may be provided from the purchaser's device, the server, or the landing pad. In an embodiment, to provide the LAND instruction, the processor of the purchaser's device executing a drone delivery application may determine whether a LAND instruction has been given by the purchaser. The LAND instruction may be given by a purchaser by interacting with the drone delivery application, such as by pressing a soft button to indicate LAND. The purchaser may press the LAND soft button when the purchaser confirms that a clear landing is possible. A clear landing may be possible when no obstructions, such as tree limbs, persons, pets, objects structures, etc. are present in the landing zone or in the approach to the landing zone from the hold-off distance. The LAND instruction may be given to the processor of the drone directly from the processor of the purchaser's device, or indirectly through the processor of the landing pad, or the server, or a combination thereof.

When the processor of the drone determines that the LAND instruction has been given (i.e., determination block 515="Yes"), the processor of the drone may receive the purchase code in block 517. When the processor of the drone determines that the LAND instruction has not been given (i.e., determination block 515="Yes"), such as after a timeout period or after receiving other instructions not to land, the processor of the drone may abandon the delivery attempt and return to the drone base or other designated place with the package in block 529. In some embodiments, the processor of the purchaser's device may cancel the drone delivery based on being called away from the delivery destination or other reason. Alternatively or additionally, the processor of the purchaser's device may detect that an ABORT button has been pressed to abort the delivery for some reason, such as an obstruction in the landing zone, or for another reason.

In determination block 519, the processor of the drone may determine that the purchase code is authenticated. For example, in some embodiments, the processor of the drone may determine that the received purchase code matches a stored purchase code. In other embodiments, the processor of the drone may forward the received purchase code to a processor of a server for authentication. When the server authenticates the purchase code, the authentication may be forwarded to the processor of the drone.

When the processor of the drone determines that the purchase code is authenticated (i.e., determination block 519="Yes"), the processor of the drone may begin a landing sequence in block 521. The processor may begin the landing sequence by controlling the drone to begin descending toward the landing zone. The processor of the drone may further engage with landing aids provided on a landing pad in the landing zone. Alternatively or additionally, the processor of the drone may engage with a processor of the purchaser's device to receive landing guidance. In some embodiments, the landing guidance may include "follow me" guidance to a particular spot in the landing zone.

When the processor of the drone determines that the purchase code is not authenticated (i.e., determination block 519="No"), the processor of the drone may abandon the delivery attempt and return to the drone base or a designated location in block 529.

In determination block 525, the processor of the drone may determine whether the drone has landed. For example, the processor of the drone may receive information from landing devices provided on landing skids of the drone. The landing devices may provide a signal to the processor of the drone indicating that landing has occurred. In some embodiments, the landing devices may be configured to detect the combined weight of the drone and the package, or a respective portion thereof, and provide a signal to the processor of the drone.

When the processor of the drone determines that the drone has landed (i.e., determination block 525="Yes"), the processor may release the package and confirm delivery in block 531. In some embodiments, the processor of the drone may simply release the package based on authenticating the purchase code and confirm delivery when the package is released. The processor of the drone may release the drone by activating a release mechanism that holds the package. In other embodiments, the processor of the drone may confirm delivery before package release by performing confirmation operations such as capturing an image of the purchaser and performing additional authentication (e.g., facial recognition). In some embodiments, the processor of the purchaser's device may scan a delivery code on the package and provide the delivery code directly or indirectly to the processor of the drone. For example, the processor of the purchaser's device may scan a delivery code on the package and provide the delivery code to the server, which may forward the delivery code, or a confirmation that the delivery code was received, to the processor of the drone.

When the processor of the drone determines that the drone has not landed (i.e., determination block 525="No"), the processor may proceed to determine whether the landing has been aborted in determination block 527. When the processor of the drone determines that the landing has been aborted (i.e., determination block 527="Yes") the processor of the drone may abandon the landing and delivery attempt and return to a drone base or a designated location in block 529. Additional operations may be performed in connection with aborting a landing as shown and described in FIG. 5B. When a landing sequence has already begun, the processor of the drone may abandon the landing sequence and return the drone to the hold-off distance and initiate flight at the designated flight altitude. When the processor of the drone determines that the landing has not been aborted (i.e., determination block 537="No"), the processor of the drone may return to determination block 525 to continue to determine whether the drone has landed. When the processor of the drone determines that the drone has landed as described above, (i.e., determination block 525="Yes"), the processor may release the package and confirm delivery in block 531. For example, in some embodiments, a purchaser device may scan a delivery code and remit the scanned code to the processor of the drone and/or a server processor to confirm delivery and provide a record of delivery.

In block 533, the processor of the drone may provide an indication or notification of successful delivery and delivery confirmation. The indication or notification may be provided to devices, such as to one or more of the processor of the purchaser's device, the server, the processor of the landing pad. The indication or notification may further contain a confirmation number, captured images that verify delivery, and other information. Additional operations may be performed in connection with providing an indication or notification of successful delivery and delivery confirmation as shown and described in FIG. 5C.

Figure 5B:
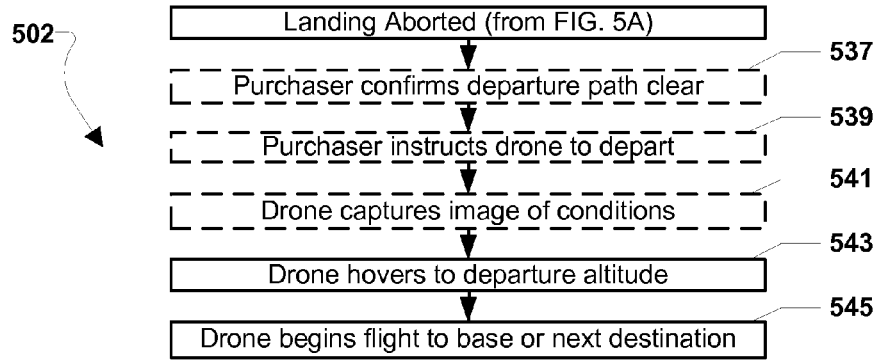
FIG. 5B-FIG. 5E are process flow diagrams illustrating embodiment methods for providing drone security including abort landing, delivery confirmation, and alternative navigation.

When a drone landing is aborted additional operations may be performed in an embodiment method 502, as illustrated FIG. 5B. As described in connection with FIG. 5A, such as in determination block 527, one or more of a processor of drone, a processor of a purchaser's device, a processor of a server, may determine that a landing should be aborted or has been aborted. Aborting a landing could be for any of a variety of reasons. For example, an order may be cancelled, a purchase code authentication could fail, a delivery destination could be changed, and so on.

Referring to FIG. 5B, in block 537, the processor of the purchaser's device may determine that the departure path for the drone is clear from obstructions. For example, a purchaser may visually confirm that the departure path is clear and engage a user interface of the purchaser's device to confirm. The processor of the purchaser's device, such as through the drone delivery application, may receive a user interface signal of the confirmation (e.g., button press). In some embodiments, one or more of the processor of the drone, the processor of the purchaser's device, and the processor of the landing pad may capture images of the departure path using a camera or cameras (or other sensors) and may thereby confirm a clear departure path for the drone.

In block 539, one or more of the processor of the purchaser's device, the processor of the landing pad, and the server, may optionally provide an explicit instruction to depart. For example, an explicit instruction may be provided when the departure path has been confirmed to be clear.

In block 541, the processor of the drone may capture images of the departure conditions using a camera or cameras. The images may be upward in the direction of the departure path, downwards in the direction of the landing zone, and in other directions, or a combination of directions. The captured images may provide evidence of landing conditions, such as in the event the drone does not successfully depart.

In block 543, the processor of the drone may direct the drone to a departure altitude. For example, the processor of the drone may direct the drone to fly to a designated altitude for flight. Alternatively or additionally, the processor of the drone may direct the drone to an intermediate altitude that is clear of obstructions, such as a hold-off altitude before flying to a designated flight altitude.

In block 545, the processor of the drone may direct the drone to begin flight to a drone base or to a next destination. In some embodiments, the processor of the drone may be pre-programmed with a base destination that the drone returns to after delivery. In other embodiments, the processor of the drone may receive a designated destination from the server, or other device.

Figure 5C:
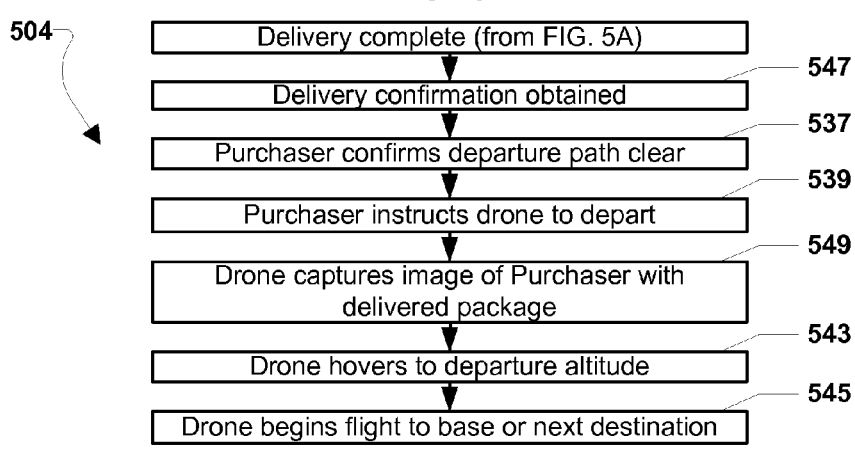

When delivery is complete, as described in FIG. 5A, additional operations may be performed in an embodiment method 504, as illustrated FIG. 5C. As described in connection with FIG. 5A, such as in block 533, the processor of the drone may provide an indication or notification of successful delivery and delivery confirmation. In block 547 of FIG. 5C, one or more of the processor of the drone, the processor of the purchaser's device, the processor of the landing pad, and the server may obtain a delivery confirmation. For example, the processor of the drone may obtain a delivery confirmation from the server, such as when a processor of the purchaser's device scans a label for a delivery code. Alternatively or additionally, the processor of the drone may receive the delivery confirmation directly from the processor of the purchaser's device. The processor of the drone may independently confirm delivery, such as by capturing images.

In block 549, the processor of the drone may capture images of the purchaser with the delivered package, such as using a camera or cameras. The captured images may be used for further confirmation of delivery. In other embodiments, the captured images may be used to independently confirm delivery. Further, the processor of the drone may independently generate a delivery confirmation, such as by one or a combination of capturing images of the purchaser with the package, receiving the delivery code from the processor of the purchaser's device (e.g., by the purchaser scanning a QR code on the package and transmitting that information to the drone in order to get it released by the drone), the processor of the landing pad, or the server. Alternatively, any one of the aforementioned operations may be used to confirm delivery. When delivery is confirmed, the operations in blocks 539, 543, and 545 may be repeated such that the processor of the drone may depart the landing zone and direct the drone to a base or a new destination.

Figure 5D:
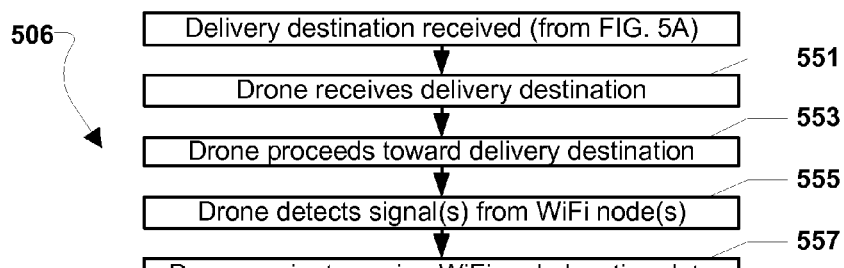

When the delivery destination is received by the processor of the drone, as described in block 507 of FIG. 5A, additional operations may be performed in an embodiment method 506, as illustrated FIG. 5D. In block 551, the processor of the drone may receive a delivery destination as described herein. For example, the delivery destination may be a street address, GNSS coordinates, a map tile designating a landing zone on a map, and so on.

In block 553, the processor of the drone may direct the drone toward the delivery destination. For example, the processor of the drone may direct the drone to fly along designated travel routes based on the destination. The processor of the drone may direct the drone to fly at a designated altitude. The processor of the drone may use GNSS signals to confirm its travel along the designated routes and altitudes. Alternatively, the processor of the drone may navigate directly to the destination using GNSS navigation. In some embodiments, the processor of the drone may lose contact with GNSS signals or lose trust in GNSS signals (e.g., based on receiving pirate GNSS signals) and may risk becoming lost or going off course at least for a period of time causing potential delivery delays, package/drone theft, and/or tampering.

Thus, in block 555, the processor of the drone may detect signals associated with WiFi nodes, or other short and medium range communication nodes, along the travel route. By detecting the WiFi nodes, the processor of the drone may receive beacon signals or other signals that identify each WiFi node, such as by SSID, MAC address or other identifier. The drone processor may refer to information about the location of the WiFi nodes in order to determine the drones' relative position to the WiFi nodes. The processor of the drone may use the WiFi nodes location information and the relative position information to determine its present location and course. The processor of the drone may use the location information developed using the WiFi nodes to confirm the GNSS position of the drone (i.e., determine whether the GNSS signals are trustworthy or pirate signals). Further, the processor of the drone may use the location information of the WiFi nodes as a way to navigate to the destination without the use of GNSS position information. For example, the GNSS signals may be lost due to natural or man-made obstacles. The GNSS signals may be lost due to terrain features, or the presence of buildings that give rise to an "urban canyon" effect. Further, GNSS signals may become "jammed," "hacked," or otherwise interfered with. Alternatively, the GNSS signals may be overtaken by malicious actors having the intention to guide the drone to an alternative destination.

In the event the GNSS signal is lost or compromised, the processor of the drone may switch from GNSS navigation to WiFi node navigation. In some embodiments, WiFi node navigation may be augmented by other navigation techniques, such as dead-reckoning, camera-based recognition of the land features below the drone (e.g., recognizing a road, landmarks, highway signage, etc), or other techniques.

In block 557, the processor of the drone may proceed toward the destination using the WiFi node location information. As the drone flies toward the destination, the processor of the drone may detect additional signals, such as from additional WiFi nodes or other nodes that are located along the travel route of the drone. More specifically, the WiFi nodes or other nodes may not be physically located on the travel route, but may have signal ranges that extend toward the travel route of the drone. The processor of the drone may detect the WiFi node signals and confirm or correct its course based on the detected signals and the location information associated with the corresponding node. For example, the processor of the drone may refer the SSID information, MAC address information, or other information associated with a signal detected from a given WiFi node. The SSID, MAC address, or other information in the detected node signal may be used with a Location Information Service (e.g., LIS), to obtain the registered location of the WiFi node. The LIS information may be obtained through a connection to the server or to an Internet connection to the LIS provider. Alternatively or additionally, the LIS information for particular nodes may be stored in the drone from previous flights in the area or may be stored in a cache that is regularly populated by a server. The location information from a series of WiFi nodes along a travel route may allow the processor of the drone to navigate toward the destination in addition to GNSS or without the use of GNSS. Further, the processor of the drone may navigate toward the destination and may obtain information from a signal provided by the WiFi node or nodes without the need to actually connect with the WiFi nodes.

Figure 5E:
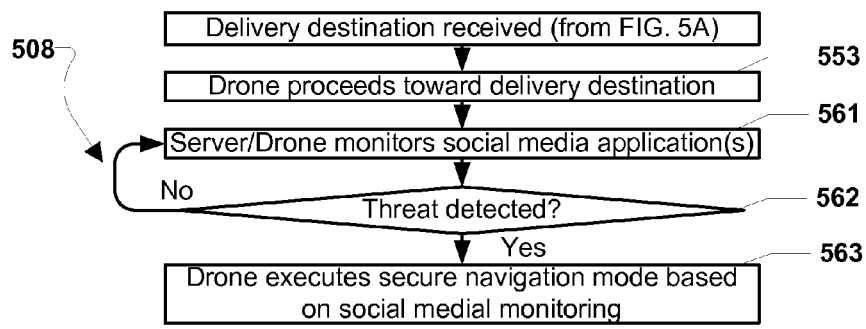

Additional operations may be performed in an embodiment method 508, as illustrated in FIG. 5E when the delivery destination, which may be a street address, GNSS coordinates, a map tile designating a landing zone on a map, or similar destination information, is received by the processor of the drone, as described with reference to block 507 of FIG. 5A.

In block 553, the processor of the drone may direct the drone toward the delivery destination as described above with reference to FIG. 5D. For example, the processor of the drone may direct the drone to fly to the destination along designated travel routes, at a designated altitude, and using one or more navigation methods for navigation.

In block 561, one or more of the processor of the server or the processor of the drone may monitor social media, such as one or more social media applications. Social media applications may include Facebook, email, text messages, Instant Messages, chat sessions, and so on. For example, the processor of the server and/or the processor of the drone may be connected to the Internet through one or more connections to a server, a WiFi node, a user device, or other network access providing device. The processor of the server and/or the processor of the drone may receive social media information, such as social media posts associated with the purchaser or other posts. The processor of the server and/or the processor of the drone may determine whether the posts represent a potential security threat. For example, the posts may be outgoing posts from the purchaser relaying information about the drone's current location, delivery status, or destination. Alternatively or additionally, the processor of the drone may monitor social media for indications that the drone's current location, status, or destination are being monitored or are known to potential malicious actors. By monitoring social media the processor of the drone may try to detect that jamming measures or other measures are being contemplated to intercept, jam, hijack, or otherwise tamper with the drone.

In determination block 562, the processor of the server and/or the processor of the drone may determine whether a threat has been detected. In response to the processor of the server and/or the processor of the drone determining that a threat has been detected (i.e. determination block 562="Yes"), in block 563, the processor of the drone may execute a secure navigation mode and/or take actions to ensure the security of the drone. For example, the processor of the drone may change course heading, altitude, or other flight parameter. The processor of the drone may limit the amount of information transmitted about its current location, destination, and delivery status. In some embodiments the processor of the drone may, in cooperation with the server, limit the amount of information provided to the purchaser. For example, the purchaser may no longer be provided with periodic location updates that may be transmitted using social media, or may wind up on social media. Further in a secure navigation mode, the processor of the drone may further switch navigation methods. For example, the drone may switch from using GNSS navigation and proceed toward the destination using WiFi node location information obtained from making contact with WiFi nodes as described herein in connection with FIG. 5D. In response to the processor of the server and/or the processor of the drone determining that a threat has not been detected (i.e. determination block 562="No"), the processor of the server and/or the processor of the drone may return to block 561 to continue monitoring social media.

Figure 6A:
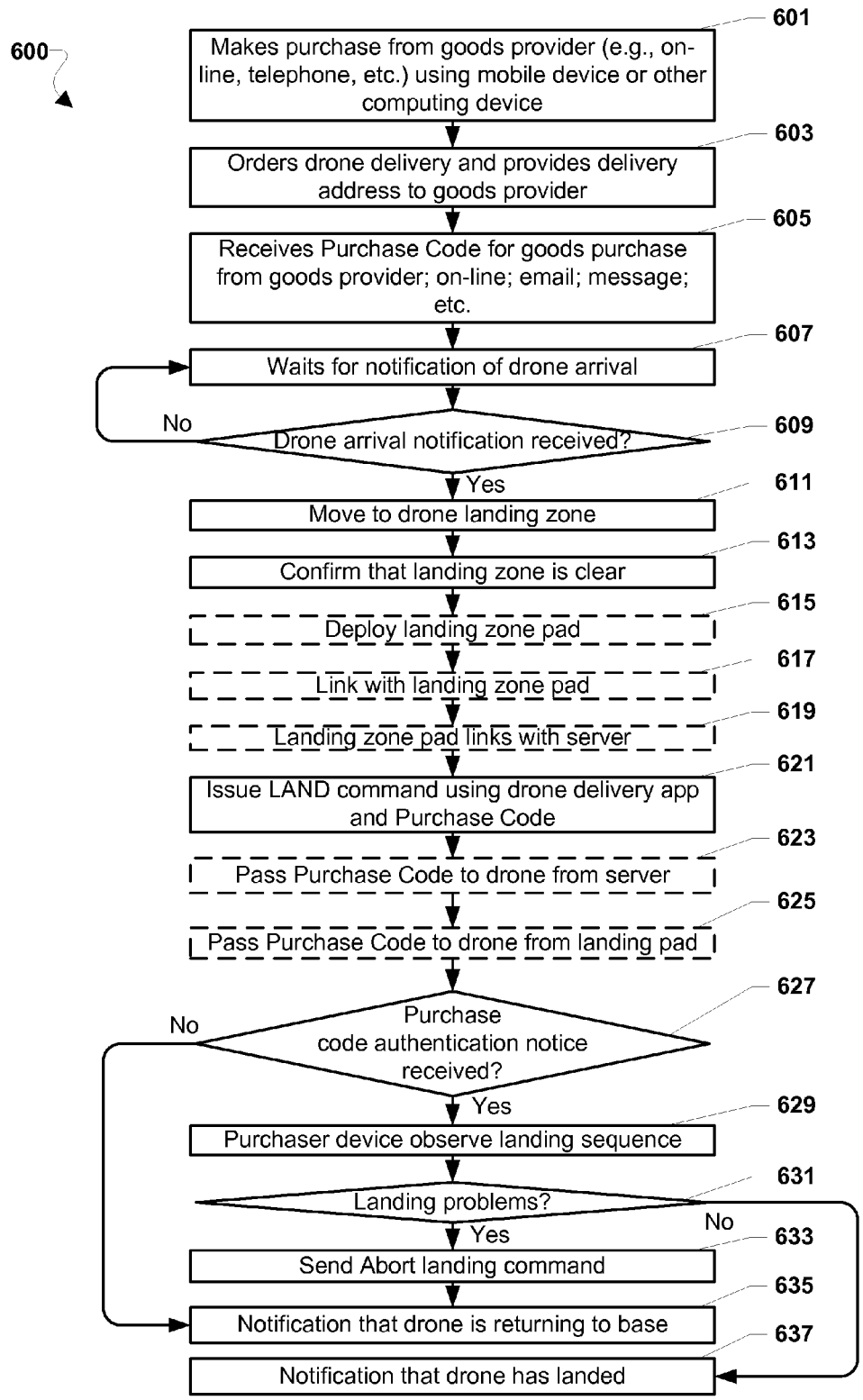
FIG. 6A is a process flow diagram illustrating an embodiment method of providing drone security and purchaser operations including providing a purchase code.

While described embodiment methods may generally relate to perspectives of the processor of the drone, additional perspectives are possible in some embodiments. An embodiment method 600 illustrated in FIG. 6A includes a perspective that is generally from a processor of a purchaser device.

In block 601, the processor of the purchaser's device may make a purchase of goods from a goods provider, such as when a purchaser selects goods for purchase and provides payment. The processor of the purchaser's device may execute a software application associated with goods purchase, drone delivery, and other offerings from the goods provider. The software application may provide a user interface on the display of the purchaser's device. The software application may further provide communication by controlling communication hardware and protocols to enable the purchaser's device to interact with the goods provider. The software application may also provide other functionality.

The processor of the purchaser's device may connect with a processor of a server associated with the goods provider, such as through the user interface and display of the purchaser's device. The processor of the purchaser's device may access a selection of goods for purchase and display the goods to the purchaser through the user interface. The processor of the purchaser's device may connect through a network connection, a telephone connection, or other connection. The connection may be a secure connection. The processor of the purchaser's device may provide information for payment such as a credit card number or other payment information, which may be stored on or entered into the purchaser's device.

In block 603, the processor of the purchaser's device may select drone delivery and provide a destination address to the goods provider for delivery. The processor of the purchaser's device may provide the destination address to the goods provider by prompting the purchaser to provide a destination address. The purchaser may provide the destination address by entering the destination address as a street address, entering GNSS coordinates, or by designating a landing zone tile or icon on a map displayed by the processor on a user interface of the purchaser's device. In some embodiments, the purchaser may select a "find me" option, where the drone will locate the purchaser by a tracking mechanism, such as a location service that locates the purchaser's device. The purchaser may provide a general destination, address or location and the drone may locate the purchaser's device when it approaches nearer to the given general destination.

In block 605, the processor of the purchaser's device may receive a purchaser code from the goods provider, such as over the connection between the processor of the purchaser's device and the server of the goods provider. The purchase code may be a unique one-time code generated by the goods provider and associated with the transaction that enables delivery to be authenticated. The code may be an arbitrary numerical or alpha-numerical code, a sequential transaction number, a hash code, an encrypted code or other code. The purchase code may be a unique one-time code among generated codes for pending deliveries. When deliveries are completed, the codes may be recycled. The processor of the purchaser's device may receive the code through the connection with the goods provider during the purchase transaction, or may receive the purchase code after the transaction is completed and verified, such as when payment is successfully processed. The processor of the purchaser's device may receive the code in a subsequent communication, such as a text message, an email message, a message associated with the software application or other message or communication. The processor of the purchaser's device may store the code for delivery authentication as will be described in greater detail hereinafter.

In block 607, the processor of the purchaser's device may await notification that the drone has arrived in or near the landing zone. For example, when the drone nears the landing zone at a hold-off distance from the landing zone the processor of the purchaser's device may receive a notification from the drone when communication is established with the drone. In other embodiments, the processor of the purchaser's device may receive the notification from the server of the goods provider. In some embodiments, the notification may be provided when the drone arrives near the landing zone, or periodically as the drone approaches the landing destination. In some embodiments, the processor of the purchaser's device may receive a notification that may include an estimated arrival time at the landing zone.

In determination block 609, the processor of the purchaser's device may determine whether the drone arrival notification has been received. When the processor of the purchaser's device determines that the drone arrival notification has not been received (i.e., determination block 609="No"), the processor of the purchaser's device may continue to wait for the notification of drone arrival in block 607.

When the processor of the purchaser's device determines that the drone arrival notification has been received (i.e., determination block 609="Yes"), the processor of the purchaser's device may prompt the purchaser to move to the landing zone in block 611. Alternatively, the purchaser may move to the landing zone with the purchaser's device such that further operations may be performed.

In block 613, the processor of the purchaser's device may confirm that the landing zone is clear. The, processor of the purchaser's device may confirm a clear landing zone by sending a message or other communication to the processor of the drone. For example, the processor of the purchaser's device may execute a drone delivery application that may be configured to establish communication with the processor of the drone. The processor of the drone may also be executing a drone oriented version of the delivery application or a compatible application.

In block 615, a landing pad may optionally be deployed into position in the landing zone. The landing pad may be a portable mat that can be positioned in the landing zone when the drone nears the destination. The landing pad may alternatively be a permanent or semi-permanent pad that may be installed in a designated landing area for drones. The landing pad may be a simple pad having a size larger than a dimension of the landing mechanisms of the drone. The landing pad may have one or more of radio landing aids, optical landing aids, electronic landing aids, visual landing aids, or other landing aids. The landing aids may assist the drone to conduct a more accurate landing within the landing zone, such as on to the landing pad. The landing pad may be placed in an area of the landing zone such that it is clear of any obstructions in an approach and departure path. The processor of the landing pad may communicate with the processor of the purchaser's device, the processor of the drone, the server, and so on. The processor of the landing pad may further control the landing aids.

In block 617, the processor of the purchaser's device may link with the processor of the landing pad to establish communications. In some embodiments, the processor of the purchaser's device may use the communication capabilities of the landing pad to communicate with the drone. Further, the processor of the purchaser's device may control the operation of the landing pad for drone landing and departure guidance.

In block 619, the processor of the landing pad may link with the server, such as through a connection with a local access point at the purchaser's residence, or through a connection with the purchaser's device. Alternatively, the processor of the landing pad may establish a connection with the server through an independent cellular connection.

In block 621, the processor of the purchaser's device may issue a LAND command, which may include the purchase code, to the drone using a soft button displayed by the drone delivery application executing thereon. In some embodiments, the processor of the purchaser's device may issue the LAND command and the purchase code separately. The processor of the purchaser's device may issue the LAND command when the purchaser has confirmed the landing area is clear, deployed the landing mat, and is ready to receive the package. The LAND command may signal to the drone to begin landing. However, the drone may authenticate the purchase code before landing to ensure security of the drone and package.

In block 623, the processor of the purchaser's device may optionally pass the purchase code to the server, whereupon the server may pass the purchase code to the drone for authentication. Alternatively, the server may authenticate the purchase code and provide the drone a message or notification that the purchase code was authenticated.

In block 625, the processor of the purchaser's device may optionally pass the purchase code to the landing pad, whereupon the landing pad may pass the purchase code to the drone for authentication. Alternatively, the landing pad may pass the purchase code to the server. The server may pass to the drone or may authenticate the purchase code and provide a notification of authentication to the drone.

In determination block 627, the processor of the purchaser's device may receive a notification that the purchase code was authenticated. When the processor of the purchaser's device receives a notification that a purchase code has been authenticated (i.e., determination block 627="Yes"), the processor of the purchaser's device may observe the landing sequence, such as through a camera of the device in block 629. The processor of the purchaser's device may be configured to detect abnormal conditions, such as obstructions or other situations, particularly in the landing zone that may give rise to landing problems for the drone. The purchaser may also observe the landing sequence for any anomalous conditions that would give rise to landing problems, such as a child running into the landing zone. When the processor of the purchaser's device does not receive a notification that a purchase code has been authenticated, or receives a notification that that a purchase code has not been authenticated (i.e., determination block 627="No"), the processor of the purchaser's device may receive a notification that the drone is returning to base in block 635.

In determination block 631, the processor of the purchaser's device may determine whether there are landing problems. In some embodiments, the processor of the purchaser's device may determine that there is an obstruction in the landing zone, that the drone has contacted or will likely contact the obstruction, and other problems or likely problems. Alternatively or additionally, the purchaser may observe a problem in the landing zone and indicate to the processor of the purchaser's device that there is a problem in the landing zone by interacting with a user interface of the drone delivery application. In some embodiments, processor of the purchaser's device may determine that a new obstruction (e.g., a child, pet, person, object, etc.) has strayed into or is otherwise present the landing zone, which was previously clear, such as when landing was initiated.

When the processor of the purchaser's device determines that landing problems are present (i.e., determination block 631="Yes"), the processor of the purchaser's device may send an ABORT command to the drone to abort the drone landing in block 633. Alternatively or additionally, the ABORT landing command may be sent by the processor of the purchaser's device to the server, which may forward the command to the drone.

When the processor of the purchaser's device determines that landing problems are not present (i.e., determination block 631="No"), the processor of the purchaser's device may receive, or wait to receive a notification that the drone has landed in block 637. The processor of the purchaser's device may display the notification that the drone has landed, which may prompt the purchaser to retrieve the package.

Figure 6B:
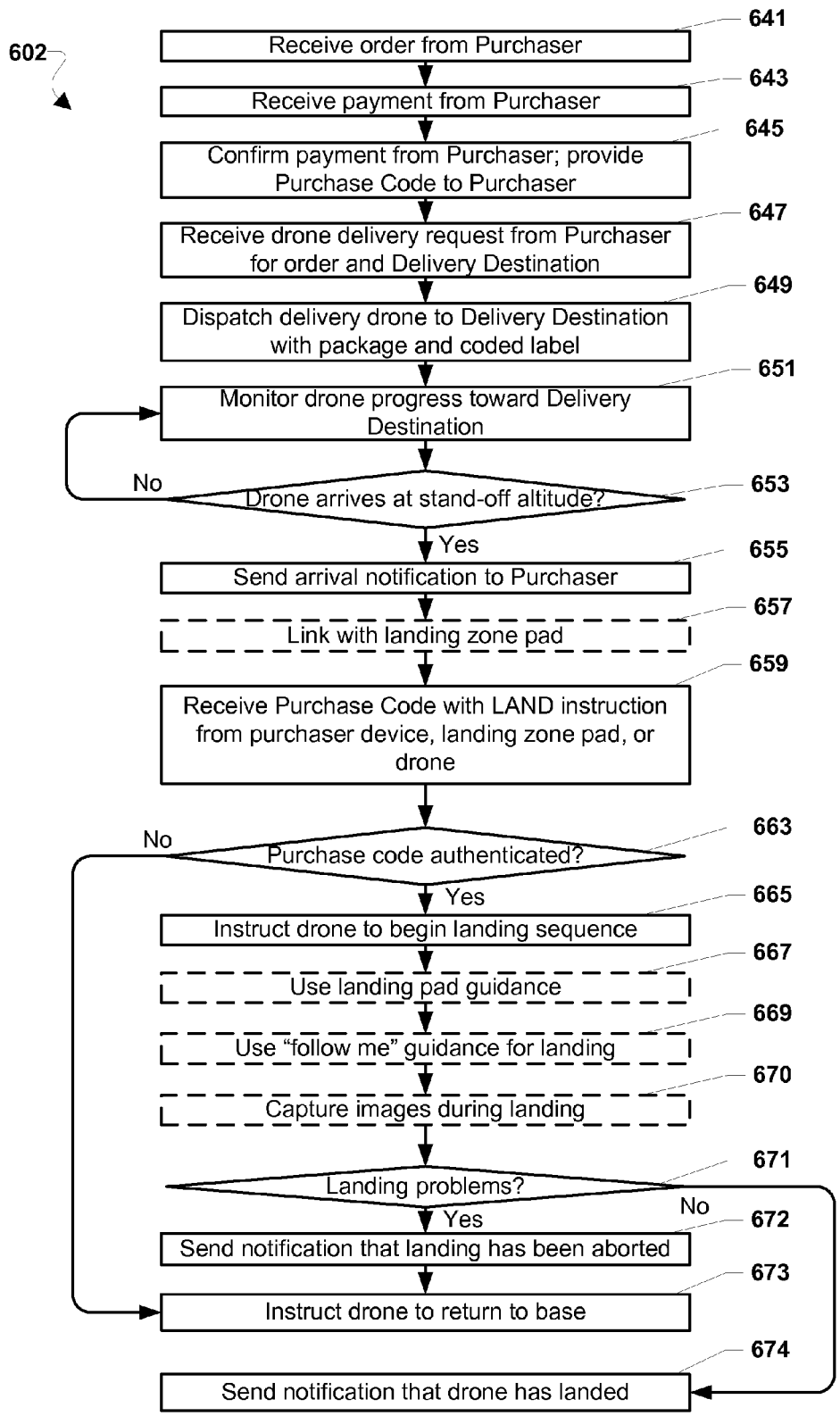
FIG. 6B is a process flow diagram illustrating an embodiment method of providing drone security and server operations including authenticating a purchase code.

FIG. 6B illustrates an embodiment method 602 from the perspective of a server, such as a server of a drone delivery service, a goods provider, or other server, which is connected with one or more of a processor of a drone, a processor of a purchaser's device, or a processor of a landing pad.

In block 641 the server may receive an order for goods from a purchaser. The order may be received by the server based on the placement of the order by the purchaser using the purchaser's device, or another device. For example, the purchaser may access the server by accessing a network-accessible (e.g., Internet) goods ordering web portal associated with the goods provider. The purchaser may access the web portal from any device having network access. In the event the purchaser does not order from their personal device, it may be necessary to designate a destination for information associated with the purchase to be sent. The destination may include an email address, a telephone number of the purchaser's personal device, or other destination such that information such as order confirmations, the purchase code, and transaction oriented information may be forwarded to the purchaser for later use.

In block 643, the server may receive a payment or payment information from the purchaser. The server may receive the payment information based on previously stored payment information and an instruction to charge the previously stored account. The server may alternatively receive the payment information from a third party payment service. The server may alternatively collect credit card or similar payment information from the processor of the purchaser's device. The server may alternatively receive payment information based on payment information provided over a telephone. Other payment methods are possible.

In block 645, the server may confirm that the payment was successfully processed and upon confirmation provide a purchase code to the purchaser. The purchase code may be one of a variety of codes as described herein. The server purchase code may forward the purchase code to processor of the purchaser's device. Alternatively, the server may forward the purchase code to a designated destination such as an email address, a text message address, or similar address, so that the purchase code is available to the purchaser. Alternatively, the processor of the purchaser's device may be executing a software application, which may be associated with drone delivery and goods purchase. In such a case, the server may forward the purchase code to the software application.

In block 647, the server may receive a request for drone delivery and the delivery destination from the purchaser. The request for drone delivery may be made before, together with, or after the purchase transaction. For example, the purchaser may have previously designated drone delivery for all deliveries. Alternatively, the purchaser may specify one-time drone delivery for the particular order or future orders. The delivery destination may be received by the server as a street address, a set of GNSS coordinates, a landing zone "tile" associated with a map image, and so on. The delivery destination may be a general area (e.g., a park, or open area) in which the purchaser may be present with an instruction to "find me," whereupon the purchaser may be found when the drone reaches the designated area.

In block 649, the server may dispatch the drone with package to the delivery destination received in block 647. The drone may be instructed by the server to proceed to the destination at a designated flight altitude for drone traffic. In some embodiments, the drone may be housed at a drone base, which may include a warehouse or other location where the drone may be equipped with a package containing the ordered goods. In other embodiments, the drone may be first dispatched to a location where the package may be provisioned on the drone and then dispatched to the delivery destination when laden with the package. In other embodiments, the drone may be preprogrammed to find the closest location where the package containing the goods may be picked up, such as near the delivery destination. The drone may fly from the base to the nearest location where the package may be picked up, pick up the package, and continue to the delivery destination.

In block 651, the server may monitor the progress of the drone toward the delivery destination. In some embodiments the server may maintain contact with the drone through a cellular communication channel or other communication channel. By maintaining contact with the drone the server may be informed of the location of the drone and may determine the drone progress. The server may further provide information such as route information, weather information, obstacle information, change in destination information, next destination information, information regarding location of WiFi nodes, or other information that may be useful to the drone.

In determination block 653, the server may determine whether the drone has arrived at the destination, such as at a stand-off altitude above the landing zone. The server may determine that the drone has arrived at or near the destination and then instruct the drone to hover at the stand-off altitude, or the drone may be pre-programmed to do so. The stand-off altitude may be an altitude that is below a designated flight altitude for the drone, such as an altitude that is safe from obstructions (e.g., above tree tops, structures, obstacles, etc.). The server may continue to monitor signals from the drone in determination block 653 (i.e., so long as determination block 653="No").

When the server determines that the drone has arrived at the stand-off altitude (i.e., determination block 653="Yes"), the server may send a notification to the purchaser that the drone has arrived. For example, the server may send the notification to the processor of the purchaser's device, whereupon a message is provided to the purchaser on the user interface of the purchaser's device that the drone has arrived. In some embodiments, the server may instruct the processor of the drone to provide the notification, or the notification may be independently provided by the processor of the drone to the processor of the purchaser's device.

In block 657, the server may optionally establish a communication link or connection with a landing pad, if one is deployed at the landing zone. By establishing a communication link with the landing pad, the server may conduct additional operations such as guidance operations using the landing aids and other features of the landing pad. Alternatively, the communication link with the landing pad may provide an alternative or additional connection to the purchaser's device and the drone.

In block 659, the server may receive the purchase code from the processor of the purchaser's device, the processor of the landing pad, or the processor of the drone. For example, the server may receive the purchase code from the processor of the purchaser's device through interaction with the software application executing on the purchaser's device. In some embodiments, the purchase code may be sent from the purchaser's device together with a LAND instruction given by the purchaser when the landing zone is clear for landing as described herein above.

In determination block 663, the server may determine whether the purchase code is authenticated. The server may compare the purchase code received in block 659 with a stored record of the purchase code based on the purchase transaction for the goods. In some embodiments, the purchase code may be encrypted or otherwise transformed by a hash or other transformation. In such embodiments, the encrypted purchase code may be decrypted or transformed to an original value, which may be compared with a stored value by the server.

In response to authenticating the purchase code (i.e., determination block 663="Yes"), the server may instruct the drone to begin a landing sequence in block 665. For example, the server may instruct the drone to begin a descent from the stand-off altitude. As described above, during the landing sequence the drone may activate cameras, landing devices, or other devices that may be configured to receive landing signals such as optical, visual, or radio signals from passive or active landing aids. The server may facilitate the descent with information obtained from other devices such as the purchaser's device, the landing pad, landing aids or other devices. In some embodiments, the server may instruct the drone to connect with the purchaser's device, a landing pad, landing aids on a landing pad and so on, in order to facilitate the landing. In other embodiments, when the drone begins a landing sequence it may be already connected with the purchaser's device, the landing pad, the landing aids and may begin the descent under control of the one or more of these devices.

In block 667, the server may optionally instruct the drone to use landing pad guidance. For example, the server may confirm that a landing pad is in use and may therefore instruct the drone to use the landing pad for more precise landing guidance.

In block 669, the server may optionally instruct the drone alternatively or additionally, to use "follow me" guidance for landing. For example, the server may instruct the drone to follow the purchaser, such as through visual tracking using a camera. The server may further instruct the drone to follow the purchaser's device, such as through a radio connection and/or by tracking a radio signal of the purchaser's device. The server may instruct the drone to use a combination of approaches for guidance.

In block 670, the server may instruct the drone to capture images during the landing sequence, such as images of one or more of the landing zone, the landing pad, the purchaser, and other landing conditions. The drone may forward the captured images to the server. The server may store the captured images in connection with the transaction and the drone delivery, such as for verification purposes of the landing conditions.

In determination block 671, the server may determine whether landing problems exist for the drone landing. The server may receive the captured images from the drone in real-time, including captured video images. The server may process the images and detect that landing problems exist for the drone, such as obstructions in the landing zone, or other indications from the images that landing problems exist. Alternatively or additionally, the server may receive images captured from other sources such as the processor of the purchaser's device or the processor of the landing pad that may be processed by the server and may indicate that landing problems exist. Further, the server may receive an indication from the processor of the purchaser's device that an ABORT button has been pressed. Alternatively, the processor of the drone may receive an ABORT indication from the purchaser's device and may forward the indication to the server.

When the server determines that landing problems exist (i.e., determination block 671="Yes"), the server may send a notification that the landing has been aborted in block 672. For example, the server may send a notification to one or more of the processor of the drone, the processor of the purchaser's device, or the processor of the landing pad that landing has been aborted. In some embodiments, when the processor of the drone receives the notification that the landing has been aborted, it may return to a stand-off altitude and await further instructions, or may return to a drone base or next destination.

When the server determines that no landing problems exist (i.e., determination block 671="No"), the server may send a notification that the drone has landed in block 674. For example, the server may send the notification to one or more of the processor of the drone, the processor of the purchaser's device, or the processor of the landing pad. In some embodiments, when the server sends the notification to the processor of the purchaser's device, the purchaser may move to the drone to retrieve the package.

In block 673, when the server determines that the landing has been aborted, the server may instruct the drone to return to a drone base. For example, the server may instruct the drone to return to a stand-off altitude and await further instructions, or alternatively or additionally, to return to a drone base or a next destination.

Figure 6C:
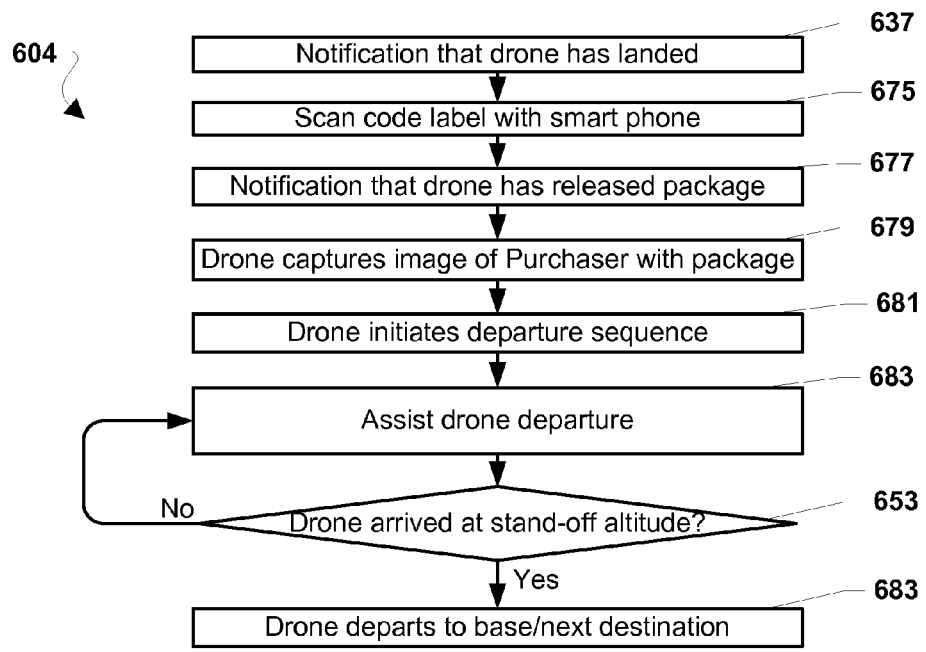
FIG. 6C-FIG. 6D are process flow diagrams illustrating embodiment methods of providing drone security and operations including delivery confirmation.

When the drone lands, additional operations may be performed in an embodiment method 604 as illustrated in FIG. 6C. In block 637, as described above, the processor of the purchaser's device may receive notification that the drone has landed. The purchaser may approach the landed drone with the purchaser's device. In some embodiments, the drone may de-activate the drone motors for safety.

In block 675, the processor of the purchaser's device may scan a delivery code. As described, the delivery code may be placed on a delivery code label or printed on a surface of the package (e.g., a QR code). The delivery code may be the purchase code or another code that identifies information about the package, or other information. By scanning the delivery code the processor of the purchaser's device may confirm that delivery has occurred. Further, by scanning the delivery code the processor of the purchaser's device may confirm that delivery is accepted. For example, the purchaser may inspect the package for damage, and may refrain from scanning the delivery code if the package appears damaged. In other embodiments, the processor of the purchaser's device may scan the delivery code first and inspect the package at a later time. In other embodiments, the processor of the purchaser's device may scan the delivery code only after the package has been opened and the contents have been inspected and tested for proper operation.

In block 677, the processor of the purchaser's device may receive a notification that the drone has released the package. The processor of the drone may release the package when landed and when the purchase code has been authenticated. In other embodiments, the processor of the drone may release the package when landed, when the purchase code has been authenticated, and when the delivery code has been scanned and remitted to the drone and/or server.

In block 679, the processor of the drone may capture an image or images of one or more of the purchaser, the purchaser and the package, the landing zone, or other conditions. In some embodiments, the processor of the drone may capture an image of the purchaser and may perform facial recognition as a further authentication procedure before releasing the package. In some embodiments, facial recognition may be performed by the processor of the drone and/or the processor of the server. In other embodiments, the processor of the drone may capture an image of the purchaser to record who accepted the package. The recorded images may be used at a later time for various purposes, such as identification, verification, or other evidentiary purposes. In embodiments where facial images are captured to record acceptance, facial recognition may be performed by the processor of the drone and/or the processor of the server. Alternatively or in addition, the processor of the drone and/or the processor of the server may log the picture for future reference (e.g., acceptance validation) or future processing operations. In other embodiments, the processor of the drone may capture an image of the purchaser and the package to confirm that the purchaser is in possession of the package. A captured image or images that confirms possession of the package, or that provides a record of other actions, may be logged, such as in a memory accessible to the processor of the drone and/or the processor of the server.

In block 682, such as when the package is released and an image or images have been captured, the processor of the drone may initiate a departure sequence. In some embodiments, the departure sequence may include the processor of the drone activating the propulsion motors of the drone, determining that the departure zone is clear from obstructions and so on.

In block 683, one or more of the processor of the purchaser's device, the server and the processor of the landing pad may provide assistance to the processor of the drone to assist in departure. For example, the processor of the landing pad may control the landing aids to provide signals to assist in the drone departure. The processor of the purchaser's device may further monitor the departure zone for any obstructions or abnormalities in the departure procedure. The server may further monitor other devices including the drone for any abnormalities or indications that there is a departure problem.

In determination block 653, one or more of the processor of the drone, the processor of the purchaser's device, the server and the processor of the landing pad may determine that the drone is at the stand-off altitude. When one or more of the processor of the drone, the processor of the purchaser's device, the server and the processor of the landing pad determines that the drone is at the stand-off altitude (i.e., determination block 653="Yes"), the processor of the drone may control the drone to depart to the drone base or next destination in block 683. The departure of the drone may be further facilitated by signals or instructions from one or more of the processor of the purchaser's device, the server and the processor of the landing pad. The drone may move from the stand-off altitude to the designated flight altitude for the departure to the base or next destination. When one or more of the processor of the drone, the processor of the purchaser's device, the server and the processor of the landing pad determines that the drone is not at the stand-off altitude (i.e., determination block 653="No"), the one or more of the processor of the drone, the processor of the purchaser's device, the server and the processor of the landing pad may continue to assist the departure in block 683.

Figure 6D:
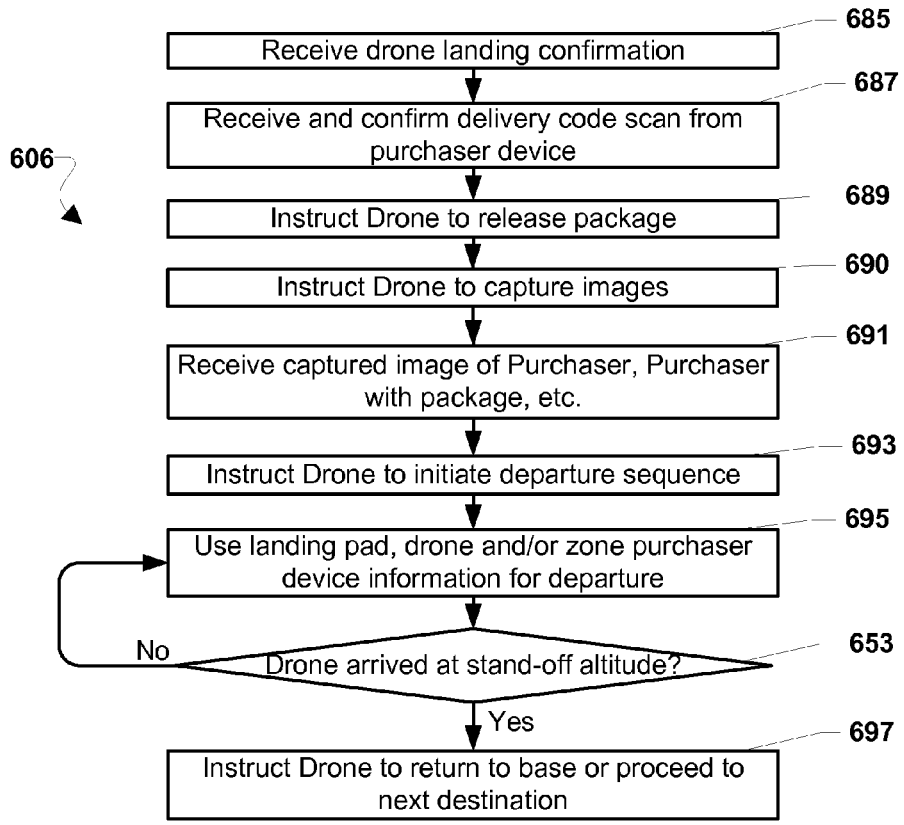

When the drone lands, alternative, additional or concurrent server operations may be performed in connection with delivery confirmation in an embodiment method 606 as illustrated in FIG. 6D. In block 685, the server may receive a confirmation of the drone landing from one or more of the processor of the drone, the processor of the purchaser's device or the processor of the landing pad.

In block 687, the server may receive a scan of the delivery code from the processor of the purchaser's device and confirm the delivery code. The delivery code may be scanned by the purchaser's device from a label on the package, the surface of the package, and so on.

In block 689, the server may instruct the processor of the drone to release the package. The package may be released before or after receiving and confirming the delivery code.

In block 690, the server may instruct the drone to capture images of the purchaser, the purchaser and the package, or other delivery conditions. In some embodiments the server may instruct the processor of the drone to capture an image of the purchaser for biometric authentication of the purchaser, such as facial recognition. In some embodiments, the biometric authentication may be a prerequisite for releasing the package.

In block 691, the processor of the drone may receive the captured images from the processor of the drone. The server may store the images in connection with the transaction. The server may further perform facial recognition or other biometric authentication on the captured images to authenticate the purchaser. In some embodiments, wherein authentication is a prerequisite for package release, the server may notify the processor of the drone that the facial recognition or other biometric authentication passed.

In block 693, the server may instruct the processor of the drone to initiate a departure sequence. In some embodiments, the departure sequence may include the server instructing the processor of the drone to activate the propulsion motors of the drone, such as when it is determined that the departure zone is clear from obstructions and so on.

In block 695, the server may use information from one or more of the processor of the drone, the processor of the purchaser's device, and the processor of the landing pad to assist in drone departure. For example, the server may use information from the processor of the landing pad to control the landing aids to provide signals to assist in the drone departure. The server may use information from the processor of the purchaser's device to monitor the departure zone for any obstructions or abnormalities in the departure procedure.

In determination block 653, the server may receive information from one or more of the processor of the purchaser's device, the server and the processor of the landing pad to determine that the drone is at the stand-off altitude. When the server determines that the drone is at the stand-off altitude (i.e., determination block 653="Yes"), the server may instruct the processor of the drone to control the drone to depart to the drone base or next destination in block 697. The drone may move from the stand-off altitude to the designated flight altitude for the departure to the base or next destination. When the server determines that the drone is not at the stand-off altitude (i.e., determination block 653="No"), the server may return to block 695 and use information from the one or more of the processor of the drone, the processor of the purchaser's device, and the processor of the landing pad to continue to assist the drone departure.

Figure 7:
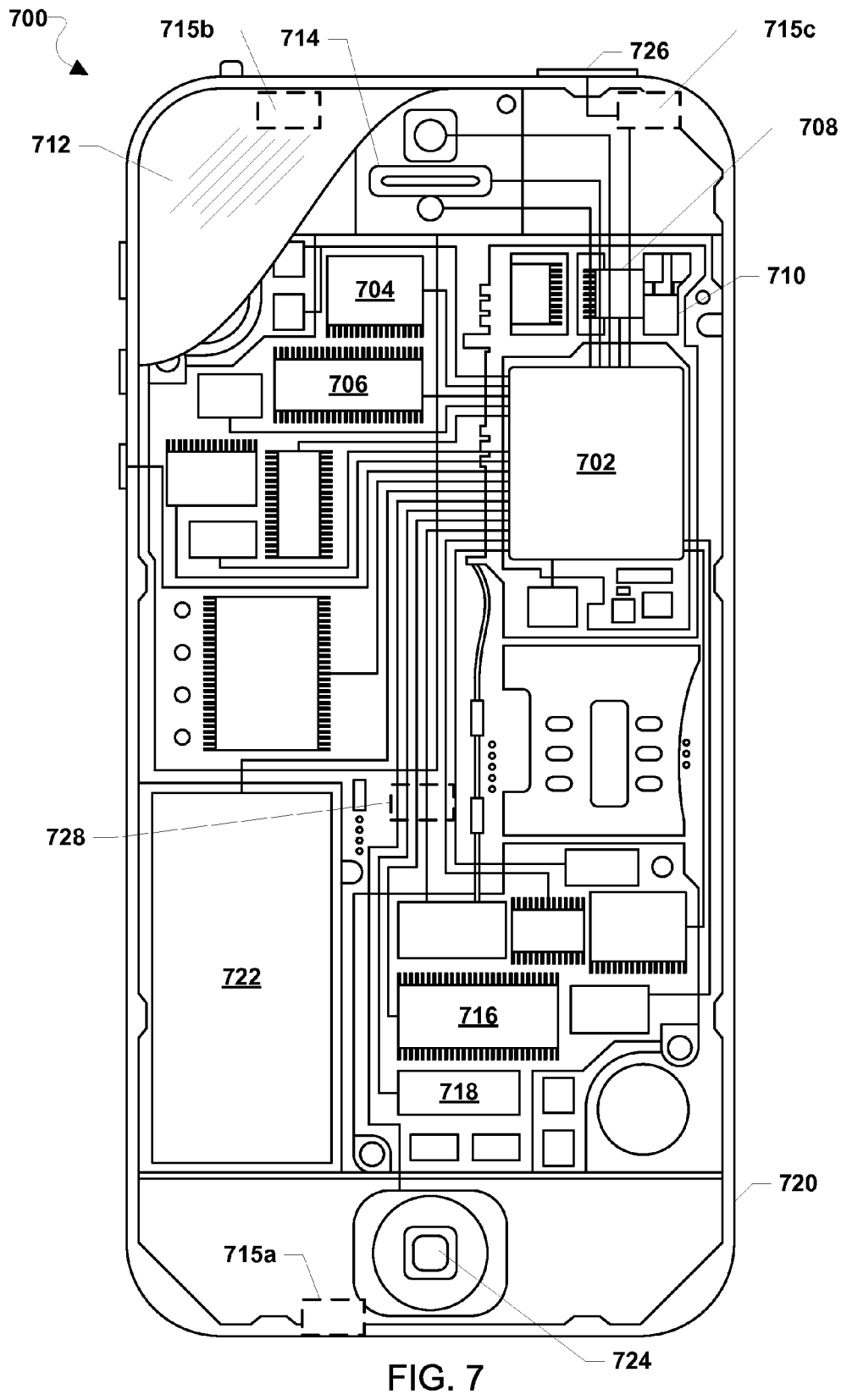
FIG. 7 is a component diagram of an example mobile computing device suitable for use with the various embodiments.

The various aspects, such as communication with the drone 100 through a purchaser's device executing a Drone Delivery App, may be implemented in any of a variety of mobile computing devices (e.g., smartphones, tablets, etc.) an example of which is illustrated in FIG. 7. The mobile computing device 700 may include a processor 702 coupled the various systems of the computing device 700 for communication with and control thereof. For example, the processor 702 may be coupled to a touch screen controller 704, radio communication elements, speakers and microphones, and an internal memory 706. The processor 702 may be one or more multi-core integrated circuits designated for general or specific processing tasks. The internal memory 706 may be volatile or non-volatile memory, and may also be secure and/or encrypted memory, or unsecure and/or unencrypted memory, or any combination thereof. In another embodiment (not shown), the computing device 700 may also be coupled to an external memory, such as an external hard drive.

The touch screen controller 704 and the processor 702 may also be coupled to a touch screen panel 712, such as a resistive-sensing touch screen, capacitive-sensing touch screen, infrared sensing touch screen, etc. Additionally, the display of the mobile computing device 700 need not have touch screen capability. The mobile computing device 700 may have one or more radio signal transceivers 708 (e.g., Peanut, Bluetooth, Bluetooth LE, Zigbee, Wi-Fi, RF radio, etc.) and antennae 710, for sending and receiving communications, coupled to each other and/or to the processor 702. The transceivers 708 and antennae 710 may be used with the above-mentioned circuitry to implement the various wireless transmission protocol stacks and interfaces. The mobile computing device 700 may include a cellular network wireless modem chip 716 that enables communication via a cellular network and is coupled to the processor.

The mobile computing device 700 may include a peripheral device connection interface 718 coupled to the processor 702. The peripheral device connection interface 718 may be singularly configured to accept one type of connection, or may be configured to accept various types of physical and communication connections, common or proprietary, such as USB, FireWire, Thunderbolt, or PCIe. The peripheral device connection interface 718 may also be coupled to a similarly configured peripheral device connection port (not shown).

In some embodiments, the mobile computing device 700 may include microphones 715. For example, the mobile computing device may have a conventional microphone 715a for receiving voice or other audio frequency energy from a user during a call. The mobile computing device 700 may further be configured with additional microphones 715b and 715c, which may be configured to receive audio including ultrasound signals. Alternatively, all microphones 715a, 715b, and 715c may be configured to receive ultrasound signals. The microphones 715 may be piezo-electric transducers, or other conventional microphone elements. Because more than one microphone 715 may be used, relative location information may be received in connection with a received ultrasound signal through various triangulation methods. At least two microphones 715 configured to receive ultrasound signals may be used to generate position information for an emitter of ultrasound energy.

The mobile computing device 700 may also include speakers 714 for providing audio outputs. The mobile computing device 700 may also include a housing 720, constructed of a plastic, metal, or a combination of materials, for containing all or some of the components discussed herein. The mobile computing device 700 may include a power source 722 coupled to the processor 702, such as a disposable or rechargeable battery. The rechargeable battery may also be coupled to the peripheral device connection port to receive a charging current from a source external to the mobile computing device 700. The mobile computing device 700 may also include a physical button 724 for receiving user inputs. The mobile computing device 700 may also include a power button 726 for turning the mobile computing device 700 on and off.

In some embodiments, the mobile computing device 700 may further include an accelerometer 728, which senses movement, vibration, and other aspects of the device through the ability to detect multi-directional values of and changes in acceleration. In the various embodiments, the accelerometer 728 may be used to determine the x, y, and z positions of the mobile computing device 700. Using the information from the accelerometer, a pointing direction of the mobile computing device 700 may be detected.

Figure 8:
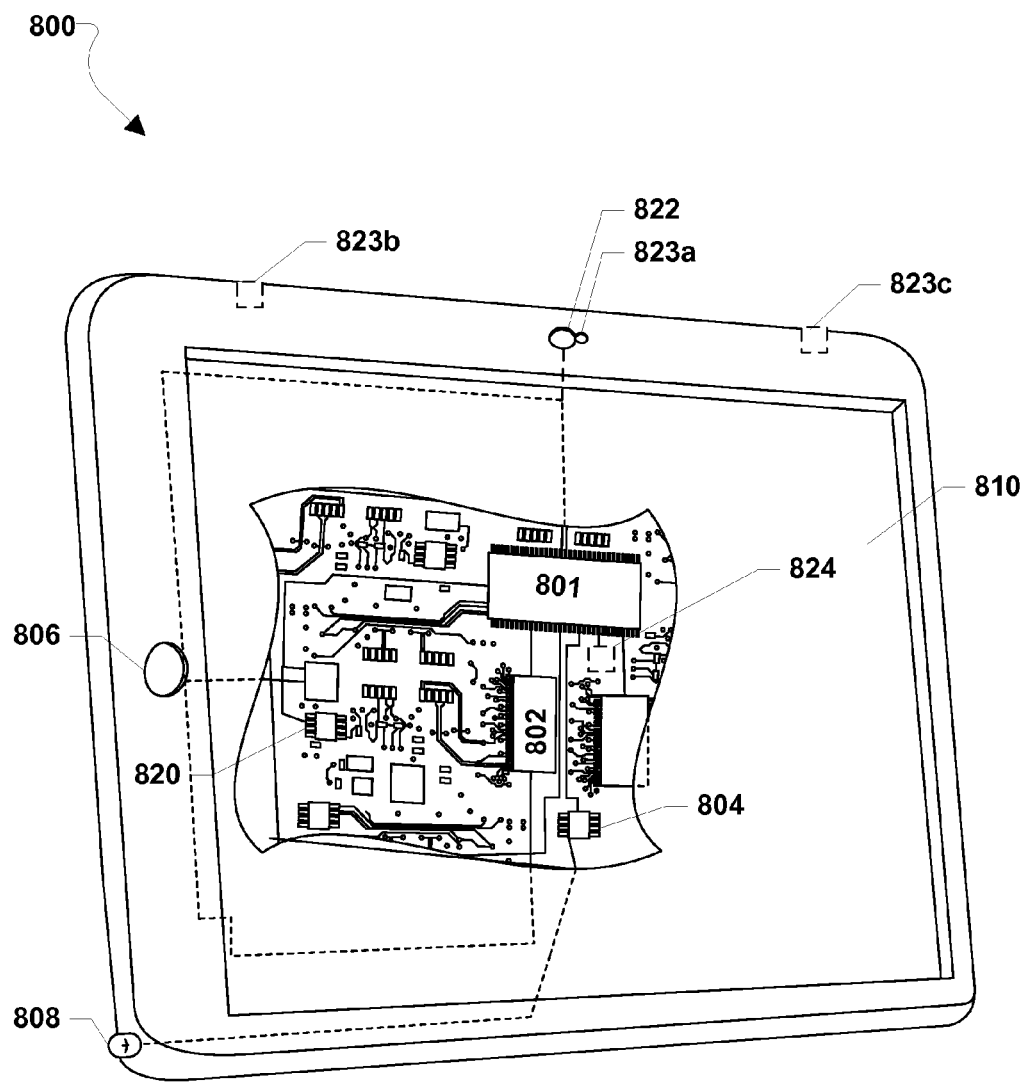
FIG. 8 is a component diagram of an example mobile computing device suitable for use with the various embodiments.

The various embodiments may be implemented in any of a variety of tablet mobile computing devices, an example of which is illustrated in FIG. 8. For example, a tablet mobile computing device 800 may include a processor 801 coupled to internal memory 802. The internal memory 802 may be volatile or non-volatile memory, and may also be secure and/or encrypted memory, or unsecure and/or unencrypted memory, or any combination thereof. The processor 801 may also be coupled to a touch screen display 810, such as a resistive-sensing touch screen, capacitive-sensing touch screen infrared sensing touch screen, etc. The tablet mobile computing device 800 may have one or more radio signal transceivers 804 (e.g., Peanut, Bluetooth, Zigbee, WiFi, RF radio) and antennas 808 for sending and receiving wireless signals as described herein. The transceivers 804 and antennas 808 may be used with the above-mentioned circuitry to implement the various wireless transmission protocol stacks and interfaces. The tablet mobile computing device 800 may include a cellular network wireless modem chip 820 that enables communication via a cellular network. The tablet mobile computing device 800 may also include a physical button 806 for receiving user inputs. The tablet mobile computing device 800 may also include various sensors coupled to the processor 801, such as a camera 822, a microphone or microphones 823, and an accelerometer 824.

For example, the tablet mobile computing device 800 may have a conventional microphone 823a for receiving voice or other audio frequency energy from a user during a call or other voice frequency activity. The tablet mobile computing device 800 may further be configured with additional microphones 823b and 823c, which may be configured to receive audio including ultrasound signals. Alternatively, all microphones 823a, 823b, and 823c may be configured to receive ultrasound signals. The microphones 823 may be piezo-electric transducers, or other conventional microphone elements. Because more than one microphone 823 may be used, relative location information may be received in connection with a received ultrasound signal through various methods such as time of flight measurement, triangulation, and similar methods. At least two microphones 823 that are configured to receive ultrasound signals may be used to generate position information for an emitter of ultrasound energy.

Also in some embodiments, the tablet mobile computing device 800 may further include the accelerometer 824 which senses movement, vibration, and other aspects of the tablet mobile computing device 800 through the ability to detect multi-directional values of and changes in acceleration. In the various embodiments, the accelerometer 824 may be used to determine the x, y, and z positions of the tablet mobile computing device 800. Using the information from the accelerometer 824, a pointing direction of the tablet mobile computing device 800 may be detected.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of receiver smart objects, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for providing security for a drone delivering a package of goods to a delivery destination, comprising:

providing, by the drone, a notification to a device of a purchaser, that the drone has arrived near the delivery destination;

hovering, by the drone, at a secure altitude from a landing zone at the delivery destination;

receiving, by the drone, a purchase code associated with a purchase of the package of goods;

authenticating, by the drone, the purchase code as a condition for landing the drone;

landing, by the drone, in the landing zone at the delivery destination when the purchase code is authenticated;

aborting the landing, by the drone, in the landing zone at the delivery destination when the purchase code is not authenticated;

monitoring, by one or more of the drone and a server, one or more web-based applications for an indication that drone information has been posted; and executing, by the one or more of the drone and the server, a secure navigation mode for the drone in response to the monitoring.

2. The method of claim 1, further comprising:

releasing, by the drone, the package of goods when the purchase code is authenticated and the landing by the drone in the landing zone is complete; and confirming, by the drone, a delivery of the package of goods when the package of goods is released.

3. The method of claim 2, wherein confirming, by the drone, the delivery of the package of goods comprises at least one of:

scanning a delivery code associated with the package of goods by the device of the purchaser, and providing the delivery code to the server by the device of the purchaser; and capturing images of one or more of: the released package of goods, the purchaser, and the landing zone.

4. The method of claim 1, wherein the purchase code is a one-time code, the method further comprising:

conducting, by the server, a purchase transaction for the purchase of the package of goods with the device of the purchaser of the package of goods; and providing the one-time purchase code, by the server, to the device of the purchaser of the package of goods.

5. The method of claim 1, further comprising guiding the landing by the drone in the landing zone by a landing pad in the landing zone, the landing pad including one or more of: a visual landing aid, an optical landing aid, and a radio landing aid.

6. The method of claim 1, further comprising determining a location of the landing zone based on a current location of the device of the purchaser.

7. The method of claim 1, further comprising navigating, by the drone, to the delivery destination using Global Navigation Satellite System (GNSS) navigation.

8. The method of claim 7, further comprising navigating, by the drone, to the delivery destination using an alternative navigation method comprising:

receiving a radio signal from one or more communication nodes along a travel route to the delivery destination, the radio signal including information about the one or more communication nodes;

determining a location of the one or more communication nodes based on the information about the communication node in the received radio signal; and determining a position of the drone based at least in part on the location of the one or more communication nodes.

9. The method of claim 1, further comprising providing the delivery destination, by the device of the purchaser, to the server, wherein the delivery destination is at least one of a street address, GNSS coordinates, and a map section, wherein an input of the map section is received as a user input on an interactive map displayed on a user interface of the device of the purchaser.

10. The method of claim 1, wherein the web-based applications include social media websites.

11. A drone device for delivering a package of goods to a delivery destination, comprising:
- a memory;
- a radio module; and
- a processor coupled to the memory and radio module, wherein the processor is configured with processor-executable instructions to perform operations comprising:
  - providing a notification to a device of a purchaser that the drone device has arrived near the delivery destination;
  - hovering at a secure altitude from a landing zone at the delivery destination;
  - receiving a purchase code associated with a purchase of the package of goods;
  - authenticating the purchase code as a condition for landing the drone device;
  - landing in the landing zone at the delivery destination when the purchase code is authenticated;
  - aborting the landing in the landing zone at the delivery destination when the purchase code is not authenticate;
  - monitoring one or more web-based applications for an indication that drone information has been posted; and
  - executing a secure navigation mode for the drone device in response to the monitoring.

12. The drone device of claim 11, wherein the processor is configured with processor-executable instructions to perform operations further comprising:
- releasing the package of goods when the purchase code is authenticated and the landing by the drone device in the landing zone is complete; and
- confirming a delivery of the package of goods when the package of goods is released.

13. The drone device of claim 11, further comprising one or more of: a camera and a landing device coupled to the processor, wherein the processor is configured with processor-executable instructions to perform operations further comprising guiding landing in the landing zone at the delivery destination by interacting with a landing pad in the landing zone, wherein interacting with the landing pad includes interacting with one or more of: a visual landing aid, an optical landing aid, and a radio landing aid of the landing pad.

14. The drone device of claim 11, further comprising a Global Navigation Satellite System (GNSS) module coupled to the processor, wherein the processor is configured with processor-executable instructions to perform operations further comprising navigating to the delivery destination using GNSS navigation.

15. The drone device of claim 14, wherein the processor is configured with processor-executable instructions to perform operations further comprising navigating to the delivery destination using an alternative navigation method comprising:
- receiving a radio signal from one or more communication nodes along a travel route to the delivery destination, the radio signal including information about the one or more communication nodes;
- determining a location of the one or more communication nodes based on the information about the communication node in the received radio signal; and
- determining a position of the drone device based on the location of the one or more communication nodes.

16. The drone device of claim 11, wherein the web-based applications include social media websites.

17. A drone for securely delivering a package of goods to a delivery destination, comprising:
- means for providing a notification to a device of a purchaser, that the drone has arrived near the delivery destination;
- means for hovering at a secure altitude from a landing zone at the delivery destination;
- means for receiving a purchase code associated with a purchase of the package of goods;
- means for authenticating the purchase code as a condition for landing the drone;
- means for landing in the landing zone at the delivery destination when the purchase code is authenticated;
- means for aborting the landing in the landing zone at the delivery destination when the purchase code is not authenticate;
- means for monitoring one or more web-based applications for an indication that drone information has been posted; and
- means for executing a secure navigation mode for the drone in response to the monitoring.

18. The drone of claim 17, further comprising:
- means for releasing the package of goods when the purchase code is authenticated and the landing by the drone in the landing zone is complete; and
- means for confirming a delivery of the package of goods when the package of goods is released.

19. The drone of claim 18, wherein means for confirming the delivery of the package of goods comprises at least one of:
- means for scanning a delivery code associated with the package of goods and providing the delivery code to a server; and
- means for capturing images of one or more of: the released package of goods, the purchaser, and the landing zone.

20. The drone of claim 17, wherein the purchase code is a one-time code.

21. The drone of claim 17, further comprising means for guiding the landing by the drone in the landing zone by interacting with a landing pad in the landing zone, the landing pad including one or more of: a visual landing aid, an optical landing aid, and a radio landing aid.

22. The drone of claim 21, further comprising means for navigating to the delivery destination using Global Navigation Satellite System (GNSS) navigation and alternative navigation methods comprising:
- means for receiving a radio signal from one or more communication nodes along a travel route to the delivery destination, the radio signal including information about the one or more communication nodes;
- means for determining a location of the one or more communication nodes based on the information about the communication node in the received radio signal; and
- means for determining a position of the drone based on the location of the one or more communication nodes.

23. The drone of claim 17, further comprising means for receiving the delivery destination from a server, wherein the delivery destination is at least one of a street address, GNSS coordinates, and a map section, wherein an input of the map section is received as a user input on an interactive map displayed on a user interface of the device of the purchaser.

24. The drone of claim 17, wherein the web-based applications include social media websites.

25. A system for providing secure package delivery at a delivery destination, the system comprising:
- a drone comprising a drone processor;
- a purchaser device comprising a purchaser device processor and configured to communicate with the drone through a communication link; and
- a server configured to communicate with one or both of the drone and the purchaser device through respective communication links,
- wherein the drone processor is configured with processor-executable instructions to perform operations comprising:
  - providing a notification to the purchaser device that the drone has arrived near the delivery destination;
  - hovering at a secure altitude from a landing zone at the delivery destination;
  - receiving a purchase code from the purchaser device, the purchase code associated with a purchase of a package of goods;
  - landing in the landing zone at the delivery destination in response to authentication of the purchase code;
  - aborting the landing in response to non-authentication of the purchase code;
  - monitoring one or more web-based applications for an indication that drone information has been posted; and
  - executing a secure navigation mode for the drone in response to the monitoring.

26. The system of claim 25, wherein the drone processor is configured with processor-executable instructions to perform operations further comprising:
- releasing the package of goods when the purchase code is authenticated and the landing by the drone in the landing zone is complete; and
- sending a message to the server confirming delivery of the package of goods when the package of goods is released.

27. The system of claim 25, further comprising a landing pad, wherein the drone processor is configured with processor-executable instructions to perform operations further comprising guiding the landing of the drone in the landing zone by interacting with the landing pad in the landing zone, the landing pad including one or more of: a visual landing aid, an optical landing aid, and a radio landing aid.

28. The system of claim 25, wherein the drone processor is configured with processor-executable instructions to perform operations further comprising:
- receiving from the server a purchase code associated with a purchase of goods in the package of goods that was previously sent to the purchaser device;
- comparing the purchase code received from the purchaser device to the purchase code received from the server;
- authenticating the purchase code in response to the purchase code received from the purchaser device matching the purchase code received from the server; and
- not authenticating the purchase code in response to the purchase code received from the purchaser device not matching the purchase code received from the server.

29. The system of claim 25, wherein the server is configured with server-executable instructions to perform operations comprising:
- receiving the purchase code from the drone;
- comparing the received purchase code with a purchase code associated with the package of goods that was previously sent to the purchaser device;
- sending a message to the drone indicating authentication of the purchase code in response to the purchase code received from the drone matching the purchase code that was previously sent to the purchaser device; and
- sending a message to the drone indicating non-authentication of the purchase code in response to the purchase code received from the drone not matching the purchase code that was previously sent to the purchaser device.

30. The system of claim 25, wherein:
- the purchaser device processor further comprises a camera and the purchaser device processor is configured with processor-executable instructions to perform operations further comprising:
  - imaging a delivery code associated with the package of goods;
  - determining the delivery code from an image of the delivery code; and
  - sending the delivery code to the server; and
- the server is configured with server-executable instructions to perform operations further comprising:
  - receiving the delivery code from the purchaser device;
  - comparing the received delivery code to a delivery code assigned to the package of goods in advance by the server; and
  - recording confirmation of delivery of the package of goods in response to the received delivery code matching the delivery code assigned to the package of goods in advance by the server.

* * * * *